US011560195B2

(12) United States Patent
 Jungnickel et al.

(10) Patent No.: US 11,560,195 B2
(45) Date of Patent: Jan. 24, 2023

(54) PROFILES FOR BICYCLE COMPONENTS

(71) Applicant: SPECIALIZED BICYCLE COMPONENTS, INC., Morgan Hill, CA (US)

(72) Inventors: Ingmar Jungnickel, Morgan Hill, CA (US); Christopher Yu, Morgan Hill, CA (US); Douglas Graham Russell, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 62 days.

(21) Appl. No.: 17/059,168

(22) PCT Filed: May 30, 2019

(86) PCT No.: PCT/US2019/034711
§ 371 (c)(1),
(2) Date: Nov. 25, 2020

(87) PCT Pub. No.: WO2019/232249
PCT Pub. Date: Dec. 5, 2019

(65) Prior Publication Data
US 2021/0206449 A1 Jul. 8, 2021

Related U.S. Application Data

(60) Provisional application No. 62/679,558, filed on Jun. 1, 2018.

(51) Int. Cl.
*B62K 19/02* (2006.01)
(52) U.S. Cl.
CPC .................................... *B62K 19/02* (2013.01)

(58) Field of Classification Search
CPC ........ B62K 19/02; B62K 19/00; B62K 19/04; B62K 19/06
See application file for complete search history.

(56) References Cited

U.S. PATENT DOCUMENTS 4,456,277 A * 6/1984 Carpenter .............. B62K 3/005
280/282
4,941,674 A 7/1990 Trimble
(Continued)

FOREIGN PATENT DOCUMENTS

CA          2 558 518 A1     4/2007
CN          204489069 U      7/2015
(Continued)

OTHER PUBLICATIONS

International Search Report for International Application No. PCT/US2019/034711 dated Aug. 9, 2019.
Smartetailing Inc: "Pinarello Dogma F10 Whitepaper 1.0—Lakeside Bicycles Lake Oswego OR 97034 503-699-8665", Jan. 10, 2017 (Jan. 10, 2017), XP055604429, Retrieved from the Internet: URL:https://www.lakeside-bikes.com/product s/pinarello-f10-whitepaper-pg1064.htm [retrieved on Jul. 10, 2019].

*Primary Examiner* — Jacob D Knutson
*Assistant Examiner* — Abigail R Hymel
(74) *Attorney, Agent, or Firm* — Knobbe Martens Olson & Bear LLP

(57) ABSTRACT

A bicycle includes a frame having cross sectional profiles. The profiles are designed according to certain criteria to enhance bicycle performance. The profiles for multiple frame members may each fall within a range for each of aspect ratio, circumference, drag coefficient, first moment of inertia and/or second moment of inertia.

20 Claims, 30 Drawing Sheets

(56) References Cited

U.S. PATENT DOCUMENTS

| | | | |
|---|---|---|---|
| 4,986,949 | A | 1/1991 | Trimble |
| 5,221,102 | A | 6/1993 | Spangler |
| 6,889,992 | B2 | 5/2005 | Vroomen et al. |
| 8,220,815 | B2 | 7/2012 | Buckenberger et al. |
| 8,556,208 | B2 | 10/2013 | Beaulieu |
| 8,641,071 | B2 | 2/2014 | D'Aluisio et al. |
| 8,857,843 | B2 | 10/2014 | Callahan et al. |
| D802,487 | S | 11/2017 | Petrov |
| 9,963,187 | B1 * | 5/2018 | Quan .................. B62K 19/04 |
| 9,981,709 | B1 | 5/2018 | Logan |
| 2004/0046352 | A1 | 3/2004 | Vroomen et al. |
| 2008/0054594 | A1 | 3/2008 | Irizar |
| 2009/0322053 | A1 | 12/2009 | Aerts |
| 2010/0225090 | A1 | 9/2010 | Cusack et al. |
| 2011/0121539 | A1 * | 5/2011 | Beaulieu ............... B62K 19/02 |
| | | | 280/281.1 |

FOREIGN PATENT DOCUMENTS

| | | |
|---|---|---|
| DE | 10 2009 027102 A1 | 12/2009 |
| EP | 1 886 906 A1 | 2/2008 |
| EP | 1 975 052 A1 | 10/2008 |
| EP | 2 165 922 A1 | 3/2010 |
| EP | 2 177 426 A1 | 4/2010 |
| JP | 2013 248999 A | 12/2013 |
| WO | WO 89/04789 A1 | 6/1989 |
| WO | WO 2008/005925 A2 | 1/2008 |
| WO | WO 2011/032222 | 3/2011 |
| WO | WO 2018/014070 | 1/2018 |

* cited by examiner

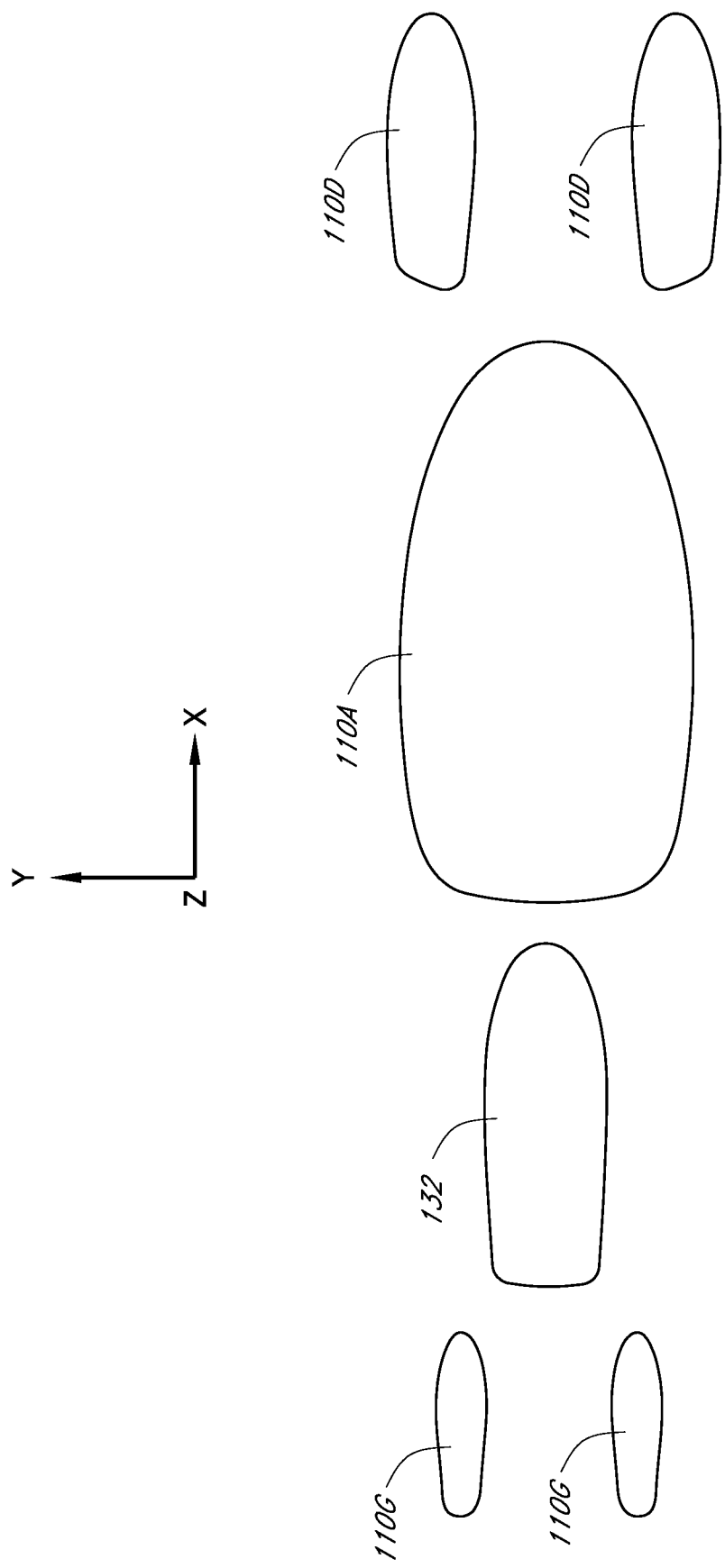

| Embodiment 1 | Embodiment 2 | Embodiment 3 |
|---|---|---|
| A cross-section with an aspect ratio between 1.5 and 4.6 | A cross-section with an aspect ratio between 1.1 and 5 | A cross-section with an aspect ratio between 1 and 8 |
| Circumference (U): $U = (37.234*AR +29.67)$ ±3% | Circumference (U): $U = (37.234*AR +29.67)$ ±5% | Circumference (U): $U = (37.234*AR +29.67)$ ±10% |
| Drag Coefficient (Cd): $Cd = 1.0627*AR\wedge-1.087$ ±6% | Drag Coefficient (Cd): $Cd = 1.0627*AR\wedge-1.087$ ±10% | Drag Coefficient (Cd): $Cd = 1.0627*AR\wedge-1.087$ ±15% |
| Second moment of area around the x-axis (IXX): $IXX= (2472.8*AR +1541.6)$ ±7% | Second moment of area around the x-axis (IXX): $IXX= (2472.8*AR +1541.6)$ ±15% | Second moment of area around the x-axis (IXX): $IXX= (2472.8*AR +1541.6)$ ±20% |
| Second moment of area around the y-axis (IYY): $IYY = 3501.1AR\wedge2.552$ ±7% | Second moment of area around the y-axis (IYY): $IYY = 3501.1AR\wedge2.552$ ±15% | Second moment of area around the y-axis (IYY): $IYY = 3501.1AR\wedge2.552$ ±20% |

*FIG. 3*

| | 210 | 220 | 230 | 240 | 250 | 260 | 270 |
|---|---|---|---|---|---|---|---|
| Aspect Ratio: | 1.55 | 1.95 | 2.83 | 3 | 3.43 | 4 | 4.6 |
| Circumference: | 89.00 | 100.00 | 137.00 | 140.00 | 156.00 | 181.00 | 200.00 |
| Cd: | 0.70 | 0.49 | 0.34 | 0.31 | 0.28 | 0.24 | 0.21 |
| IXX: | 5519.18 | 5986.19 | 8980.24 | 9015.17 | 9571.48 | 11796.69 | 12740.76 |
| IYY: | 11306.08 | 18103.62 | 50985.27 | 56226.02 | 78191.03 | 125636.39 | 173477.22 |
| Polar MomOfInertia: | 16825.26 | 24089.81 | 130589.22 | 65241.19 | 87762.51 | 137433.08 | 186217.98 |
| % Resid U | 0.98 | 1.02 | 0.99 | 1.01 | 1.01 | 0.99 | 1.00 |
| % Resid Cd | 0.943 | 1.043 | 1.024 | 1.056 | 0.980 | 0.998 | 0.963 |
| % Resid XX | 0.974 | 1.063 | 0.951 | 0.994 | 1.047 | 0.969 | 1.014 |
| % Resid YY | 0.948 | 1.063 | 0.977 | 1.028 | 1.040 | 0.958 | 0.992 |

*FIG. 4*

FreeFoil 155

| | Actual [mm] | | Normalized [-] | | |
|---|---|---|---|---|---|
| N | x | y | x | y | Mirror y |
| 1 | 0 | 0 | 0 | 0 | 0 |
| 2 | 3.54 | 7.63 | 0.111007 | 0.763764 | -0.76376 |
| 3 | 7.09 | 9.1 | 0.222327 | 0.910911 | -0.91091 |
| 4 | 11.63 | 9.68 | 0.364691 | 0.968969 | -0.96897 |
| 5 | 14.17 | 9.94 | 0.44434 | 0.994995 | -0.99499 |
| 6 | 17.72 | 9.99 | 0.55566 | 1 | -1 |
| 7 | 21.26 | 9.88 | 0.666667 | 0.988989 | -0.98899 |
| 8 | 24.8 | 9.57 | 0.777673 | 0.957958 | -0.95796 |
| 9 | 28.35 | 8.96 | 0.888993 | 0.896897 | -0.8969 |
| 10* | 31.89 | 0 | 1 | 0 | 0 |

FIG. 6A

FreeFoil 195

| | Actual [mm] | | Normalized [-] | | |
|---|---|---|---|---|---|
| N | x | y | x | y | Mirror y |
| 1 | 0 | 0 | 0 | 0 | 0 |
| 2 | 4.38 | 6.27 | 0.111055 | 0.637195 | -0.6372 |
| 3 | 8.76 | 8.08 | 0.22211 | 0.821138 | -0.82114 |
| 4 | 13.15 | 9.08 | 0.333418 | 0.922764 | -0.92276 |
| 5 | 17.53 | 9.63 | 0.444473 | 0.978659 | -0.97866 |
| 6 | 21.91 | 9.84 | 0.555527 | 1 | -1 |
| 7 | 26.29 | 9.75 | 0.666582 | 0.990854 | -0.99085 |
| 8 | 30.67 | 9.35 | 0.777637 | 0.950203 | -0.9502 |
| 9 | 35.06 | 8.64 | 0.888945 | 0.878049 | -0.87805 |
| 10* | 39.44 | 0 | 1 | 0 | 0 |

FIG. 6B

FreeFoil 283

| | Actual [mm] | | Normalized [-] | | |
|---|---|---|---|---|---|
| N | x | y | x | y | Mirror y |
| 1 | 0 | 0 | 0 | 0 | 0 |
| 2 | 6.46 | 7.13 | 0.111226 | 0.712288 | -0.71229 |
| 3 | 12.91 | 9.09 | 0.22228 | 0.908092 | -0.90809 |
| 4 | 19.36 | 9.9 | 0.333333 | 0.989011 | -0.98901 |
| 5 | 25.82 | 10.01 | 0.444559 | 1 | -1 |
| 6 | 32.27 | 9.72 | 0.555613 | 0.971029 | -0.97103 |
| 7 | 38.72 | 9.27 | 0.666667 | 0.926074 | -0.92607 |
| 8 | 45.18 | 8.77 | 0.777893 | 0.876124 | -0.87612 |
| 9 | 51.63 | 8.2 | 0.888946 | 0.819181 | -0.81918 |
| 10 | 58.08 | 0 | 1 | 0 | 0 |

*FIG. 6C*

FreeFoil 300

| | Actual [mm] | | Normalized [-] | | |
|---|---|---|---|---|---|
| N | x | y | x | y | Mirror y |
| 1 | 0 | 0 | 0 | 0 | 0 |
| 2 | 6.74 | 7.27 | 0.111129 | 0.735086 | -0.73509 |
| 3 | 13.47 | 9.09 | 0.222094 | 0.91911 | -0.91911 |
| 4 | 20.21 | 9.81 | 0.333223 | 0.991911 | -0.99191 |
| 5 | 26.95 | 9.89 | 0.444353 | 1 | -1 |
| 6 | 33.69 | 9.54 | 0.555482 | 0.964611 | -0.96461 |
| 7 | 40.43 | 9.06 | 0.666612 | 0.916077 | -0.91608 |
| 8 | 47.17 | 8.52 | 0.777741 | 0.861476 | -0.86148 |
| 9 | 53.91 | 7.89 | 0.888871 | 0.797776 | -0.79778 |
| 10* | 60.65 | 0 | 1 | 0 | 0 |

*FIG. 6D*

FreeFoil 343

| N | Actual [mm] | | Normalized [-] | | Mirror y |
|---|---|---|---|---|---|
| | x | y | x | y | |
| 1 | 0 | 0 | 0 | 0 | 0 |
| 2 | 7.69 | 6.81 | 0.111079 | 0.690669 | -0.69067 |
| 3 | 15.38 | 8.75 | 0.222158 | 0.887424 | -0.88742 |
| 4 | 23.08 | 9.68 | 0.333381 | 0.981744 | -0.98174 |
| 5 | 30.77 | 9.86 | 0.44446 | 1 | -1 |
| 6 | 38.46 | 9.43 | 0.55554 | 0.956389 | -0.95639 |
| 7 | 46.15 | 8.78 | 0.666619 | 0.890467 | -0.89047 |
| 8 | 53.85 | 8.14 | 0.777842 | 0.825558 | -0.82556 |
| 9 | 61.54 | 7.41 | 0.888921 | 0.751521 | -0.75152 |
| 10* | 69.23 | 0 | 1 | 0 | 0 |

*FIG. 6E*

FreeFoil 400

| N | Actual [mm] | | Normalized [-] | | Mirror y |
|---|---|---|---|---|---|
| | x | y | x | y | |
| 1 | 0 | 0 | 0 | 0 | 0 |
| 2 | 8.96 | 8.98 | 0.110987 | 0.898 | -0.898 |
| 3 | 17.93 | 10 | 0.222098 | 1 | -1 |
| 4 | 26.9 | 9.91 | 0.333209 | 0.991 | -0.991 |
| 5 | 35.87 | 9.46 | 0.444321 | 0.946 | -0.946 |
| 6 | 44.84 | 8.97 | 0.555432 | 0.897 | -0.897 |
| 7 | 53.82 | 8.37 | 0.666667 | 0.837 | -0.837 |
| 8 | 62.79 | 7.68 | 0.777778 | 0.768 | -0.768 |
| 9 | 71.76 | 7.02 | 0.888889 | 0.702 | -0.702 |
| 10* | 80.73 | 0 | 1 | 0 | 0 |

*FIG. 6F*

FreeFoil 500

| | Actual [mm] | | Normalized [-] | | |
|---|---|---|---|---|---|
| N | x | y | x | y | Mirror y |
| 1 | 0 | 0 | 0 | 0 | 0 |
| 2 | 11.37 | 7.73 | 0.111079 | 0.778449 | -0.77845 |
| 3 | 22.75 | 9.38 | 0.222255 | 0.944612 | -0.94461 |
| 4 | 34.12 | 9.93 | 0.333333 | 1 | -1 |
| 5 | 45.49 | 9.75 | 0.444412 | 0.981873 | -0.98187 |
| 6 | 56.87 | 9 | 0.555588 | 0.906344 | -0.90634 |
| 7 | 68.24 | 8.29 | 0.666667 | 0.834844 | -0.83484 |
| 8 | 79.61 | 7.67 | 0.777745 | 0.772407 | -0.77241 |
| 9 | 90.99 | 6.9 | 0.888921 | 0.694864 | -0.69486 |
| 10* | 102.36 | 0 | 1 | 0 | 0 |

*FIG. 6G*

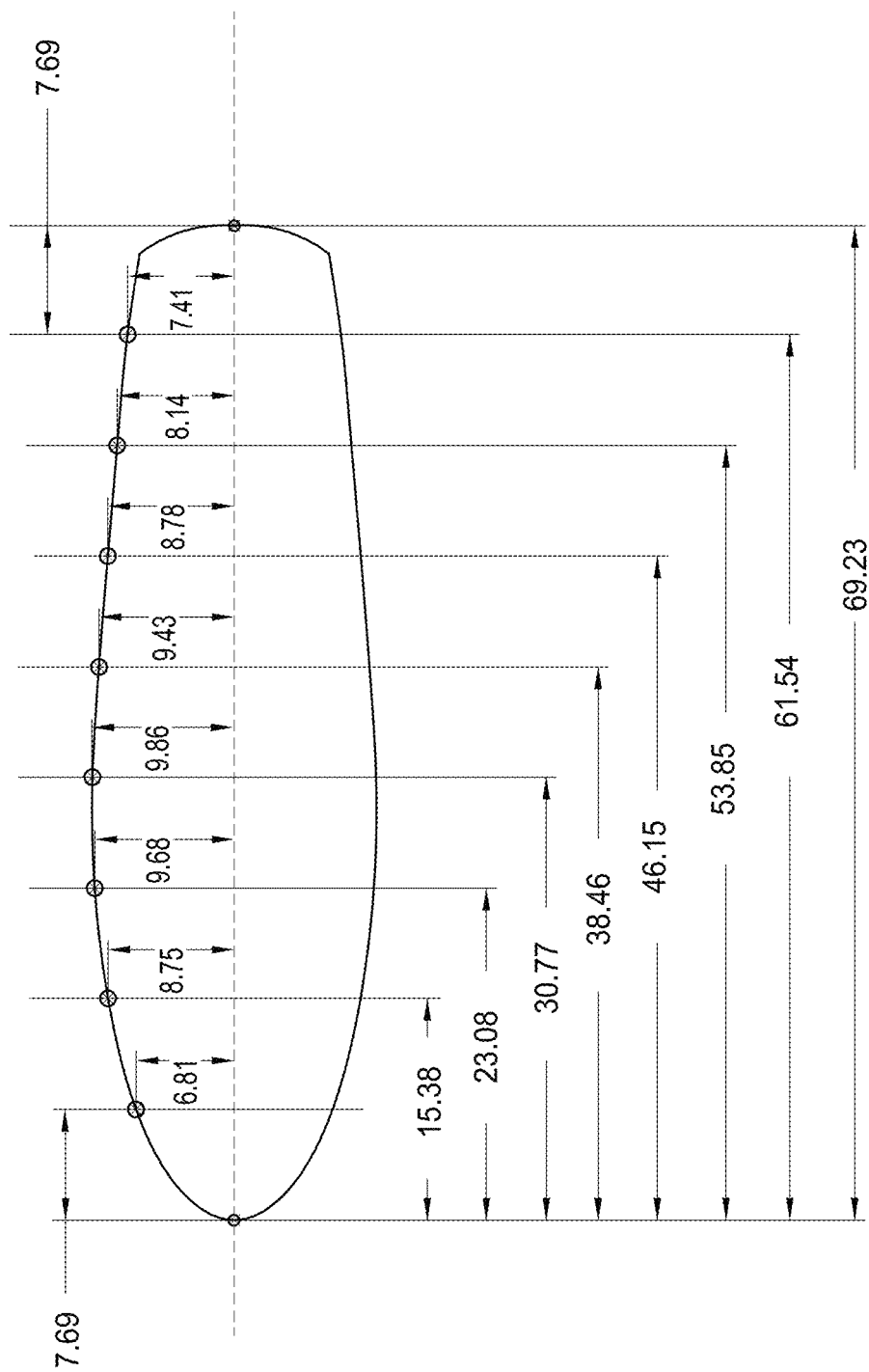

PROFILES FOR BICYCLE COMPONENTS

INCORPORATION BY REFERENCE TO ANY RELATED APPLICATIONS

This application claims the benefit of priority to U.S. provisional patent application No. 62/679,558, entitled PROFILES FOR BICYCLE COMPONENTS and filed Jun. 1, 2018, the disclosure of which is hereby incorporated by reference herein in its entirety for all purposes and forms a part of this specification.

TECHNICAL FIELD

The present technology relates to bicycles and, in particular, to profiles for bicycle components including frames, handlebars and forks.

DESCRIPTION OF THE RELATED TECHNOLOGY

The structure of a bicycle can affect the performance. Typical structures are suboptimal in one or more design parameters for bicycle structures. Therefore, improved designs that allow for better performance are desirable.

SUMMARY

The systems, methods, and devices described herein have innovative aspects, no single one of which is indispensable or solely responsible for their desirable attributes. Without limiting the scope of the claims, some of the advantageous features will now be summarized.

A bicycle includes components having cross-sectional profiles. These components include the frame members and other components of the bicycle. The profiles are designed according to certain criteria to enhance bicycle performance. The profiles for multiple components may each fall within a range for each of aspect ratio, circumference, drag coefficient, first moment of inertia and/or second moment of inertia.

In one aspect, a frame for a bicycle is described. The frame includes an elongated first member with a first cross-section, the first cross-section taken along a first horizontal plane and extending longitudinally along an X axis and laterally along a Y axis perpendicular to the X axis, the first horizontal plane containing the X and Y axes, where the bicycle is configured to travel forward in a direction that aligns with the X axis. The first cross-section being scaled proportionally to have a maximum lateral width of 20 millimeters (mm) has an aspect ratio (AR) defined as a ratio of the maximum lateral width to a maximum longitudinal length of the first cross-section, a circumference within +/−10% of U where U=37.234×AR+29.67 mm, a drag coefficient within +/−15% of Cd where Cd=1.0627×AR$^{-1.087}$, and an area moment of inertia about the X axis within +/−20% of Ixx where Ixx=2472.8×AR+1541.6 mm$^4$. In some embodiments, the first cross-section is scaled proportionally to have a wall thickness of 1.25 mm.

In another aspect, a frame for a bicycle is described. The frame includes an elongated first member with a first cross-section, the first cross-section taken along a first horizontal plane and extending longitudinally along an X axis and laterally along a Y axis perpendicular to the X axis, the first horizontal plane containing the X and Y axes, where the bicycle is configured to travel forward in a direction that aligns with the X axis. The first cross-section being scaled proportionally to have a maximum lateral width of 20 millimeters (mm) has an aspect ratio (AR) defined as a ratio of the maximum lateral width to a maximum longitudinal length of the first cross-section, a circumference within +/−10% of U where U=37.234×AR+29.67 mm, and a drag coefficient within +/−15% of Cd where Cd=1.0627×AR$^{-1.087}$.

In another aspect, a frame for a bicycle is described. The frame includes an elongated first member with a first cross-section, the first cross-section taken along a first horizontal plane and extending longitudinally along an X axis and laterally along a Y axis perpendicular to the X axis, the first horizontal plane containing the X and Y axes, where the bicycle is configured to travel forward in a direction that aligns with the X axis. The first cross-section being scaled proportionally to have a maximum lateral width of 20 millimeters (mm) having an aspect ratio (AR) defined as a ratio of the maximum lateral width to a maximum longitudinal length of the first cross-section, a drag coefficient within +/−15% of Cd where Cd=1.0627×AR$^{-1.087}$, and an area moment of inertia about the X axis within +/−20% of Ixx where Ixx=2472.8×AR+1541.6 mm$^4$.

In another aspect, a frame for a bicycle is described. The frame includes an elongated first member with a first cross-section, the first cross-section taken along a first horizontal plane and extending longitudinally along an X axis and laterally along a Y axis perpendicular to the X axis, the first horizontal plane containing the X and Y axes, where the bicycle is configured to travel forward in a direction that aligns with the X axis. The first cross-section being scaled proportionally to have a maximum lateral width of 20 millimeters (mm) and a wall thickness of 1.25 mm has an aspect ratio (AR) defined as a ratio of the maximum lateral width to a maximum longitudinal length of the first cross-section, a circumference within +/−10% of U where U=37.234×AR+29.67 mm, and an area moment of inertia about the X axis within +/−20% of Ixx where Ixx=2472.8×AR+1541.6 mm$^4$.

In some embodiments, the elongated first member comprises a down tube, a fork, a seat stay, or a seat tube. In some embodiments, the bicycle further comprises a saddle, a pedal crank, a set of handlebars, a front wheel and a rear wheel. In some embodiments, the elongated first member extends along a first axis and has a perpendicular cross-section having a maximum length and a maximum width, the perpendicular cross-section taken along a plane that is perpendicular to the first axis, and wherein the maximum length of the perpendicular cross-section is no more than three times the maximum width of the perpendicular cross-section. In some embodiments, the first cross-section is scaled proportionally to have a wall thickness of 1.25 mm.

In another aspect, a frame for a bicycle is described. The frame includes a plurality of elongated frame members each having a respective cross-section taken along a respective horizontal plane, each cross-section extending longitudinally along a respective X axis and laterally along a respective Y axis perpendicular to the respective X axis, the respective horizontal plane containing the respective X and Y axes, where the bicycle is configured to travel forward in a direction that is parallel to the respective X axes. Each of the cross-sections being scaled proportionally to have a maximum lateral width of 20 millimeters (mm) has an aspect ratio (AR) defined as a ratio of the maximum lateral width to a maximum longitudinal length of the respective cross-section, a circumference within +/−10% of U where U=37.234×AR+29.67 millimeters, a drag coefficient within +/−15% of Cd where Cd=1.0627×AR$^{-1.087}$, and/or an area moment of inertia about the X axis within +/−20% of Ixx where Ixx=2472.8×AR+1541.6 mm⁴.

In another aspect, a frame for a bicycle is described. The frame includes an elongated first member with a first cross-section, the first cross-section taken along a first horizontal plane and extending longitudinally along an X axis and laterally along a Y axis perpendicular to the X axis, the first horizontal plane containing the X and Y axes, where the bicycle is configured to travel forward in a direction that aligns with the X axis. The first member has a drag coefficient no greater than 0.7, where the drag coefficient is calculated based on an air flow having a speed relative to the bicycle from about 5 miles per hour to about 50 miles per hour and having a Reynolds number from about 5,000 to about 100,000.

In another aspect, a frame for a bicycle is described. The frame includes an elongated first member with a first cross-section, the first cross-section taken along a first horizontal plane and extending longitudinally along an X axis and laterally along a Y axis perpendicular to the X axis, the first horizontal plane containing the X and Y axes, where the bicycle is configured to travel forward in a direction that aligns with the X axis. The first cross-section being scaled proportionally to have a maximum lateral width of 20 millimeters has a profile substantially in accordance with Cartesian coordinate values of X and Y set forth in one or more of Tables 6A-6G.

In another aspect, a frame for a bicycle is described. The frame includes an elongated first member with a first cross-section, the first cross-section taken along a first horizontal plane and extending longitudinally along an X axis and laterally along a Y axis perpendicular to the X axis, the first horizontal plane containing the X and Y axes, where the bicycle is configured to travel forward in a direction that aligns with the X axis. The first cross-section being scaled proportionally to have a maximum lateral width of 20 millimeters has a profile substantially in accordance with Cartesian coordinate values of X and Y set forth in Table 6A.

In another aspect, a frame for a bicycle is described. The frame includes an elongated first member with a first cross-section, the first cross-section taken along a first horizontal plane and extending longitudinally along an X axis and laterally along a Y axis perpendicular to the X axis, the first horizontal plane containing the X and Y axes, where the bicycle is configured to travel forward in a direction that aligns with the X axis. The first cross-section being scaled proportionally to have a maximum lateral width of 20 millimeters has a profile substantially in accordance with Cartesian coordinate values of X and Y set forth in Table 6B.

In another aspect, a frame for a bicycle is described. The frame includes an elongated first member with a first cross-section, the first cross-section taken along a first horizontal plane and extending longitudinally along an X axis and laterally along a Y axis perpendicular to the X axis, the first horizontal plane containing the X and Y axes, where the bicycle is configured to travel forward in a direction that aligns with the X axis. The first cross-section being scaled proportionally to have a maximum lateral width of 20 millimeters has a profile substantially in accordance with Cartesian coordinate values of X and Y set forth in Table 6C.

In another aspect, a frame for a bicycle is described. The frame includes an elongated first member with a first cross-section, the first cross-section taken along a first horizontal plane and extending longitudinally along an X axis and laterally along a Y axis perpendicular to the X axis, the first horizontal plane containing the X and Y axes, where the bicycle is configured to travel forward in a direction that aligns with the X axis. The first cross-section being scaled proportionally to have a maximum lateral width of 20 millimeters has a profile substantially in accordance with Cartesian coordinate values of X and Y set forth in Table 6D.

In another aspect, a frame for a bicycle is described. The frame includes an elongated first member with a first cross-section, the first cross-section taken along a first horizontal plane and extending longitudinally along an X axis and laterally along a Y axis perpendicular to the X axis, the first horizontal plane containing the X and Y axes, where the bicycle is configured to travel forward in a direction that aligns with the X axis. The first cross-section being scaled proportionally to have a maximum lateral width of 20 millimeters has a profile substantially in accordance with Cartesian coordinate values of X and Y set forth in Table 6E.

In another aspect, a frame for a bicycle is described. The frame includes an elongated first member with a first cross-section, the first cross-section taken along a first horizontal plane and extending longitudinally along an X axis and laterally along a Y axis perpendicular to the X axis, the first horizontal plane containing the X and Y axes, where the bicycle is configured to travel forward in a direction that aligns with the X axis. The first cross-section being scaled proportionally to have a maximum lateral width of 20 millimeters has a profile substantially in accordance with Cartesian coordinate values of X and Y set forth in Table 6F.

In another aspect, a frame for a bicycle is described. The frame includes an elongated first member with a first cross-section, the first cross-section taken along a first horizontal plane and extending longitudinally along an X axis and laterally along a Y axis perpendicular to the X axis, the first horizontal plane containing the X and Y axes, where the bicycle is configured to travel forward in a direction that aligns with the X axis. The first cross-section being scaled proportionally to have a maximum lateral width of 20 millimeters has a profile substantially in accordance with Cartesian coordinate values of X and Y set forth in Table 6G.

In another aspect, a bicycle is described. The bicycle includes one or more of the various aspects or embodiments of the frame described herein.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Like reference numbers and designations in the various drawings indicate like elements.

FIGS. 1C-1F are cross-sectional views of the frame of FIG. 1B as taken along, respectively, the corresponding lines C-C, D-D, E-E, and F-F as indicated in FIG. 1B.

FIG. 3 is a table showing data for various parameters for three example embodiments of bicycle frame cross-sectional profiles that may be used with the bicycle of FIG. 1A.

FIG. 4 is a table showing example calculations for various parameters based on the equations in the table of FIG. 3.

FIGS. 6A-6G are tables showing example sets of Cartesian coordinate data points along the circumference of example embodiments of cross-sections of that may be used with the bicycle of FIG. 1A.

FIGS. 7A-7G are plots of the actual coordinates as provided in FIGS. 6A-6G respectively.

DETAILED DESCRIPTION

Figure 1A:
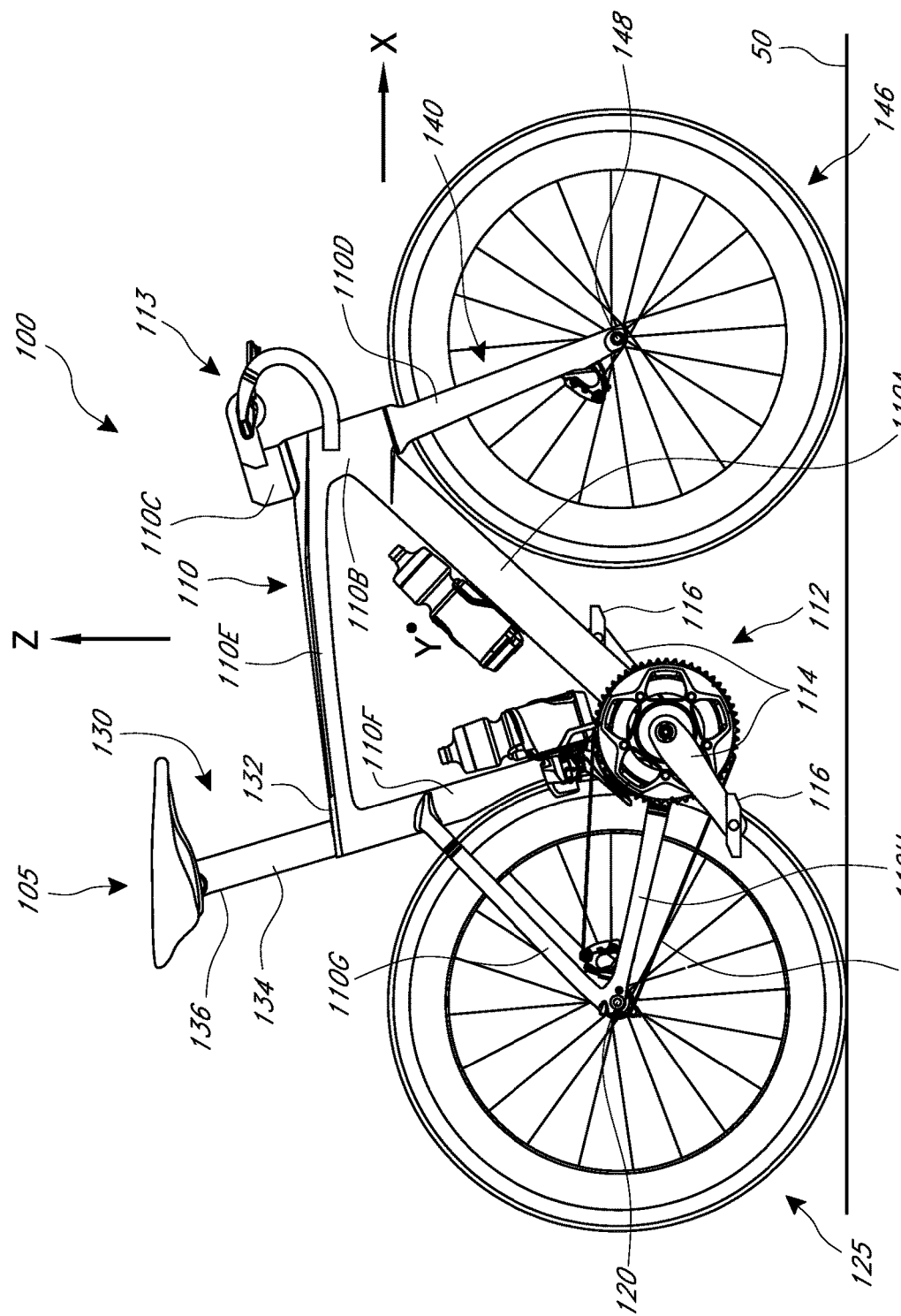
FIG. 1A is a side view of an embodiment of a bicycle having a frame and other components according to an embodiment of the present invention.

In the following detailed description, which includes any information filed herewith as an appendix, exhibit, or attachment, etc., reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and form part of this disclosure. For example, a system or device may be implemented or a method may be practiced using one or more of the various aspects set forth herein. In addition, such a system or device may be implemented or such a method may be practiced using other structure, functionality, or structure and functionality in addition to or other than one or more of the aspects set forth herein. Alterations and further modifications of the inventive features illustrated herein, and additional applications of the principles of the inventions as illustrated herein, which would occur to one skilled in the relevant art and having possession of this disclosure, are to be considered within the scope of the invention.

Descriptions of unnecessary parts or elements may be omitted for clarity and conciseness, and like reference numerals refer to like elements throughout. In the drawings, the size and thickness of layers and regions may be exaggerated for clarity and convenience.

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description" one will understand how illustrated features serve to explain certain principles of the present disclosure.

Any information filed herewith as an appendix, exhibit, attachment, etc. forms a part of this written specification and is expressly incorporated herein as part of the disclosure.

FIG. 1A is a side view of an embodiment of a bicycle 100. FIGS. 1H-1J are various views the bicycle 100. Description of the bicycle with reference to FIG. 1A may apply equally to the bicycle 100 of FIGS. 1H-1J, and vice versa. The bicycle 100 may be a road bicycle, triathlon bicycle, racing bicycle, or other bicycle. The bicycle 100 may be a high-performance bicycle. The bicycle 100 may benefit from a structural design that optimizes various performance parameters. As further described herein, these parameters may relate to the structural mass or weight of the bicycle 100, mechanical characteristics of the structure such as stiffness, volume, shape, size, etc., and/or aerodynamic characteristics such as drag coefficient, lifting or anti-lifting coefficient, air flow disruption, etc. In some embodiments, the bicycle 100 may be designed to provide for optimal combinations of parameters, such as decreased weight, increased stiffness, and decreased drag.

The bicycle 100 includes a saddle 105 connected to the top of a frame 110 by a saddle post 130. A rider may sit on the saddle 105 while riding the bicycle 100. The saddle post 130 includes a lower support 134 extending upward from the top of the frame 110 and adjustably attached to an upper support 136 that attaches to the saddle 105. The saddle post 130 may be a suspension saddle post configured to absorb or attenuate compressive loads on the saddle due to the rider's weight. The bicycle 100 may comprise the saddle 105 coupled to the saddle post 130 that is coupled to an upper seat tube portion 132 of the frame 110. "Tube" as used herein is not meant to imply the cross-section is a circular or similar shape and includes a variety of profiles with different shapes, including circular or otherwise. The saddle 105 may be configured to move or slide up or down relative to the bicycle frame 110 by the upper support 136 of the saddle post 130 that is configured to slide relative to the lower support 134 of the saddle post 130. In this embodiment, the upper support 136 may collapse within the lower support 134; however, other arrangements may be utilized.

The bicycle 100 may include a pedal crank 112 having two pedal arms 114 each connected to a pedal 116. The rear wheel 125 is rotatably coupled to the bicycle frame 110 at rear axle 120. The pedal crank 112 is rotatably coupled to the frame 110. The pedal crank 112 is configured to be rotated or driven by the two arms 114 extending therefrom and having the pedals 116 coupled to distal ends thereof. The pedal crank 112 is coupled to a chain 118 which transfers rotary motion of the pedal crank 112 to the rear wheel 125. This configuration enables rotation of the pedal crank 112 in response to a user pumping the pedals 116 to cause the rear wheel 125 to rotate about the rear axle 120. The pedal crank 112 may connect to a lower portion of the frame 110. Adjustable gears may be included to adjust the amount of torque supplied to the rear wheel 125 due to rotation of the pedal crank 112. The rear wheel 125 and axle 120 are connected to a rearward portion of the frame 110. The front of the frame 110 may include a fork assembly 140 having a distal end connected to a front axle 148 about which a front wheel 146 rotates. The upper end of the front of the frame 110 may be connected to the handlebars 113 as shown.

Various geometric references may be used for the sake of clarity in description. An X-Y-Z axis system is indicated, where each axis is perpendicular to the other two axes. The X-axis may align with a direction of forward travel of the bicycle 100. The Z axis may extend perpendicularly upward relative to the X axis. The Y axis may be "into the page" as oriented in FIG. 1A, such that the Y axis follows the "right hand rule" relative to the X and Z axes. Various planes may be referred to with reference to the axes. For example, the XY plane includes the X and Y axes, etc. "Horizontal" as used herein may refer to a plane that is parallel to the XY plane. In some embodiments, the XY plane may be defined with respect to the forward direction of travel of the bicycle 100, as described.

In some embodiments, the XY plane may be defined with respect to a surface 50 over which the bicycle 100 is travelling. The surface 50 may be flat or generally flat. The XY plane may be parallel to the surface 50. The XY plane may be parallel to a line through two contact points between the two tires of the bicycle 100 and the surface 50.

Unless otherwise noted either expressly or by context, "proximal" refers to a direction generally toward or closer to a rider of the bicycle 100, and "distal" refers to a direction generally away or farther from the rider. "Upper," "upward" and the like, and "lower," "downward" and the like, may have the same meaning as "proximal" and "distal," respectively, assuming the bicycle 100 is in an upright orientation, such as shown in FIG. 1A, and may refer to directions in the +Z and −Z directions, respectively, as indicated by the Z axis. "Forward," "front" and the like may refer to a direction in the +X direction as indicated by the X-axis in FIG. 1A. "Rearward," "back" and the like may refer to a direction in the +Y direction (into the page) as indicated by the Y-axis in FIG. 1A

The frame 110 shown is an example supporting structure for the bicycle 100. The frame 110 may have a variety of configurations, shapes, sizes, etc. which may all benefit from the designs and features disclosed herein. The frame 110 includes various structural members connected together. Forces from the rider may be transmitted through the frame 110 to the wheels 125, 146. The bicycle 100 includes various components, which includes the frame 110, handlebars 113, and other components. It is understood that one or more features described herein with respect to a "frame" may be applied to other components of the bicycle, such as the handlebars 113, stem 110C, and other components.

As shown, the frame 110 includes a down tube 110A. The down tube 110A extends from a lower, rearward first end at or near the pedal crank 112 to a forward, upper second end at or near the handlebars 113. The down tube 110A defines an angle with respect to a portion of the X axis extending forward of the bicycle 100, which angle may be from about twenty degrees to about seventy degrees or other angles.

The forward end of the down tube 110A connects to a head tube 110B. The head tube 110B may be angled with respect to a portion of the Z axis that extends below the bicycle 100, which angle may be from about negative thirty to about positive thirty degrees, or other angles. A stem 110C extends upwardly from the head tube 110B and bends to extend forwardly to connect to the handlebars 113 at a distal end of the stem 110C. First and second forks 110D extend downwardly from the head tube 110B on both lateral sides of the bicycle 100 and connect with the axle 148. "Lateral" refers to a direction parallel or generally parallel to the Y axis.

A top tube 110E extends from a forward, upper first end to a rearward, lower second end and is located at or near the top of the frame 110. In some embodiments, the top tube 110E may extend from a forward, lower first end to a rearward, upper second end, or the top tube 110E may be horizontal, i.e. parallel or generally parallel to the X axis. The top tube 110E may connect at the forward end to the head tube 110B and extend rearwardly therefrom. The top tube 110E may be angled with respect to a portion of the X axis that extends forward of the bicycle 100, which angle may be from about negative thirty to about positive thirty degrees, or other angles.

A seat tube 110F connects to the top tube 110E. An upward first end of the seat tube 110F connects to the rearward end of the top tube 110E and extends downward therefrom. The seat tube 110F may extend downward from the upper first end to a lower second end. The lower second end of the seat tube 110F may be located forward of the upper first end, as shown. In some embodiments, the lower second end of the seat tube 110F may be located rearward of the upper first end. The lower second end of the seat tube 110F connects to the lower end of the down tube 110A. The upper end of the seat tube 110F connects to or includes the upper seat tube portion 132 that connects to the saddle post 130. The upper seat tube portion 132 may be parallel or generally parallel to the seat tube 110F that extends below the top tube 110E. In some embodiments, the upper seat tube portion 132 may be angled with respect to the seat tube 110F that extends below the top tube 110E.

First and second seat stays 110G extend from a respective upper, forward first end to a respective lower, rearward second end that is located at or near the rear axle 120. The first and second seat stays 110G maybe mirror images of each other. The first end of the seat stays 110G may connect to the seat tube 110F and/or the top tube 110E. The seat stays 110G may be angled with respect to a portion of the X axis that extends forward of the bicycle 100, which angle may be from about ten degrees to about eighty degrees, or other angles. The rearward second end of the first and second seat stays 110G connect to an upper, rearward first end of a respective first and second chain stay 110H. The chain stays 110H may be mirror images of each other. The chain stays 110H extend from the upper, rearward first end to a lower, forward second end that is located at or near the pedal crank 112. The chain stays 110H each form an angle with respect to a portion of the X axis that extends forward of the bicycle 100, which angle may be from about negative thirty to about thirty degrees, or other angles. In some embodiments, the rearward end of the chain stays 110H may be located vertically even with or lower than the forward end of the chain stays 110H.

The various components or members of the frame 110 may be designed for enhanced performance of the bicycle 100. The bicycle 100 may be used in races where speed and time are important. The frame 110 may be designed to provide for enhanced aerodynamic characteristics while providing sufficient stiffness and low weight for these and other applications. Such considerations may be used to design the cross-sectional profiles of the down tube 110A, the head tube 110B, the stem 110C, the forks 110D, the top tube 110E, the seat tube 110F, the seat stays 110G and/or the chain stays 110H. These members of the frame 110 may be extended members, as described. The cross-sectional profiles may be taken in a plane that is parallel to the X-Y plane.

Figure 1B:
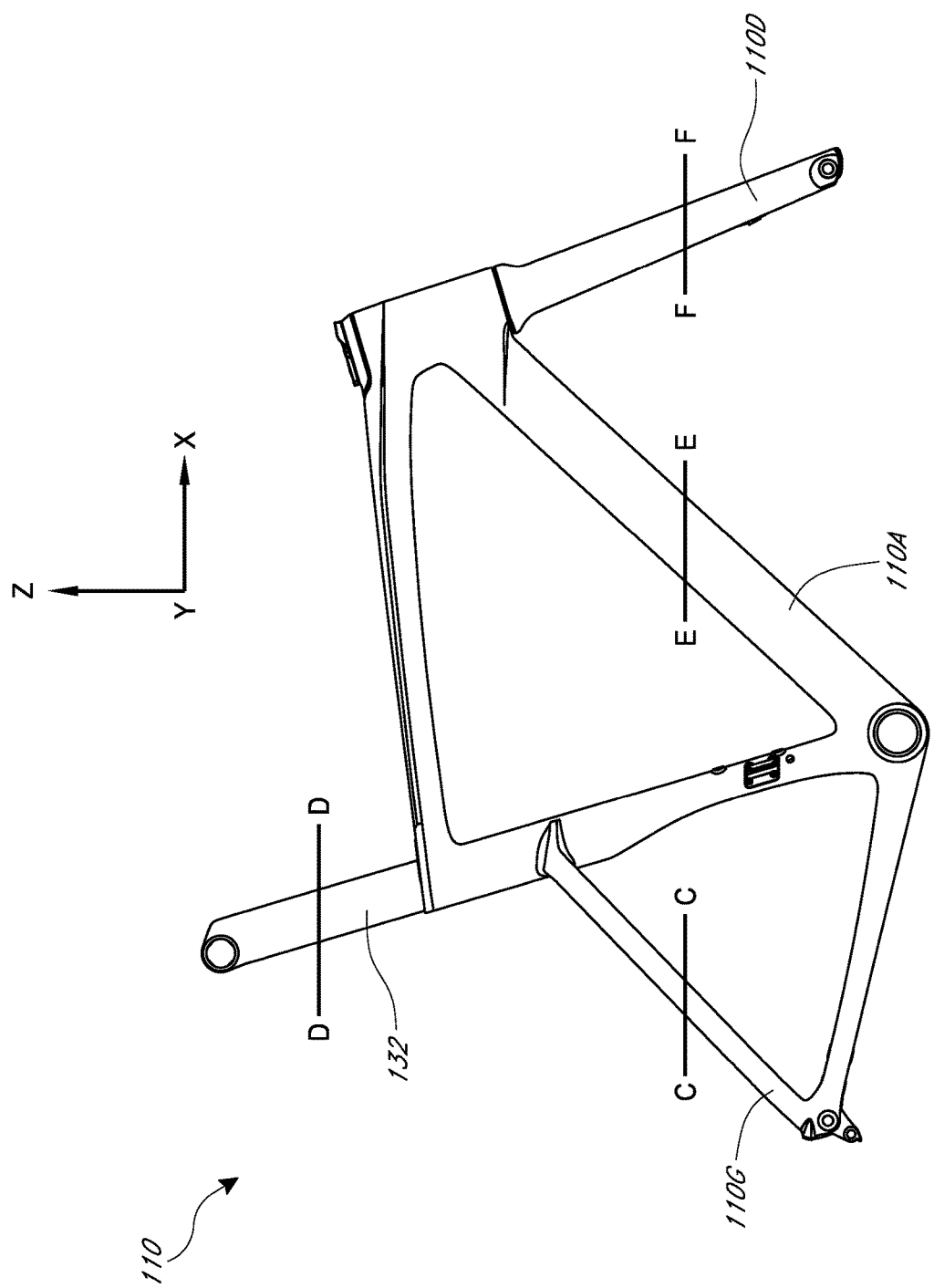
FIG. 1B is a side view of the frame from FIG. 1A and showing geometric planes through which cross-sectional cuts may be made as a design reference for frame members of the frame.

FIG. 1B is a side view of the frame 110 from the bicycle 100. FIGS. 1K-1M are various views of the frame 110. Description of the frame with respect to FIG. 1B may apply equally to the frame 110 of FIGS. 1K-1M, and vice versa. In FIG. 1B, various local planes are indicated showing where a cross-section of the various members of the frame 110 may be taken. These cross-sections may be designed or configured, as further described herein, to achieve enhanced performance targets with the bicycle 100. The plane C-C extends through the seat stays 110G. The plane D-D extends through the seat tube 132. The plane E-E extends through the down tube 110A. The plane F-F extends through the forks 110D. A geometric X-Y-Z axis system is indicated for reference, where the Y axis extends "into the page" as oriented per the right hand rule. The directions of the axes align with the corresponding axes indicated in FIG. 1A. As shown in FIG. 1B, the planes C-C, D-D, E-E, and F-F are parallel to the X-Y plane.

FIGS. 1C-1F are cross-sectional views of the frame 110 as taken along, respectively, the corresponding lines C-C, D-D, E-E, and F-F as indicated in FIG. 1B. The geometric X-Y-Z axis system is indicated for reference, where the Z axis extends "into the page" as oriented per the right hand rule. The directions of the axes align with the corresponding axes indicated in FIGS. 1A and 1B. FIG. 1C depicts the cross-sections of the seat stays 110G. FIG. 1D depicts the cross-section of the seat tube portion 132. FIG. 1E depicts the cross-section of the down tube 110A. FIG. 1F depicts the cross-sections of the forks 110D.

The various cross-section profiles may be configured based on various design criteria, as further described herein. In some embodiments, at least a portion of the seat stays 110G may have a cross-section as defined by cross-section 260 as shown and described in FIG. 2. In some embodiments, at least a portion of the seat tube portion 132 may have a cross-section as defined by cross-section 230 as shown and described in FIG. 2. In some embodiments, at least a portion of the down tube 110A may have a cross-section as defined by cross-section 220 as shown and described in FIG. 2. In some embodiments, at least a portion of the forks 110D may have a cross-section as defined by any of the cross-sections 240, 250 or 260 as shown and described in FIG. 2.

In some embodiments, the members of the frame 110 may have non-uniform cross-sections along the length of the members. For example, the forks 110D may have a first cross-section at a first location along the length thereof that is the same or similar to the cross-section 240, a second cross-section at a second location along the length thereof that is the same or similar to the cross-section 250, and a third cross-section at a third location along the length thereof that is the same or similar to the cross-section 260. This is merely one example and other combinations of two or more different cross-sections may be used along the length of this or other of the members of the frame 110.

The various aspects of the cross-sections may apply to cross-sections taken along a "horizontal" plane as described herein, and/or along other planes.

Figure 1G:
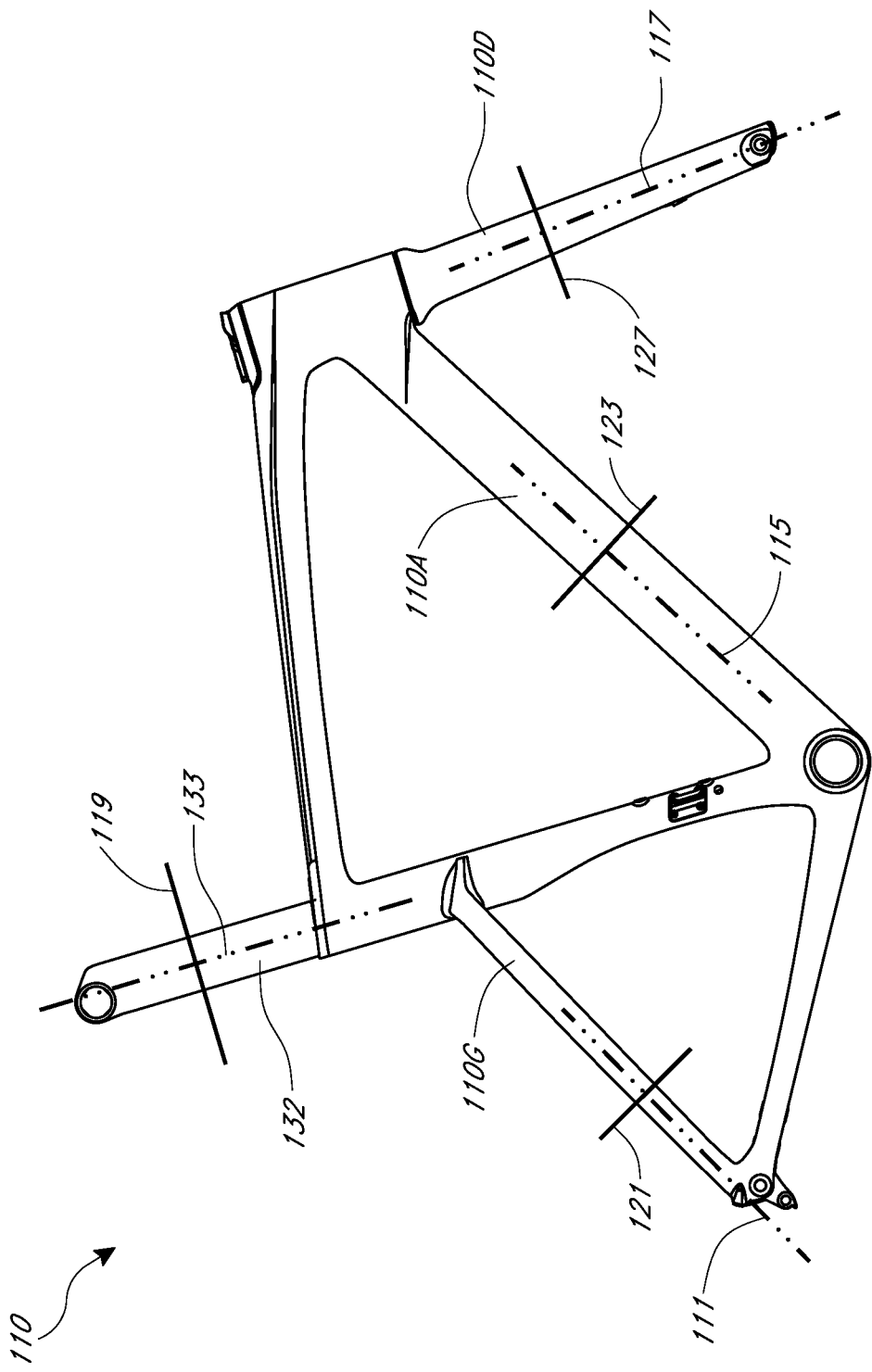
FIG. 1G is a side view of the frame from FIG. 1A showing geometric planes through which perpendicular cross-sectional cuts may be made as a design reference for the frame members.
Figure 1H:
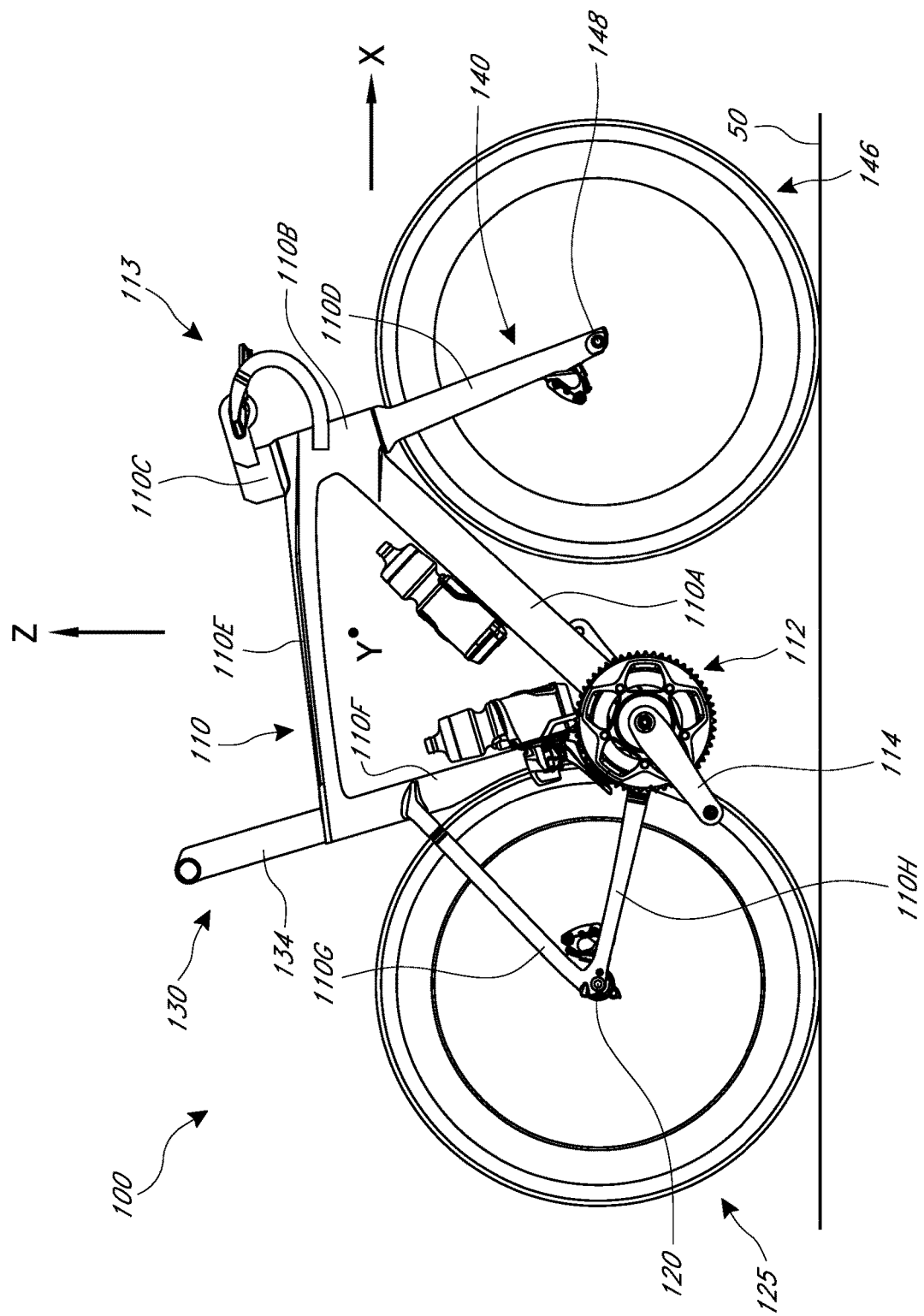
FIG. 1H is a side view of the bicycle of FIG. 1A with some components removed for clarity.
Figure 1I:
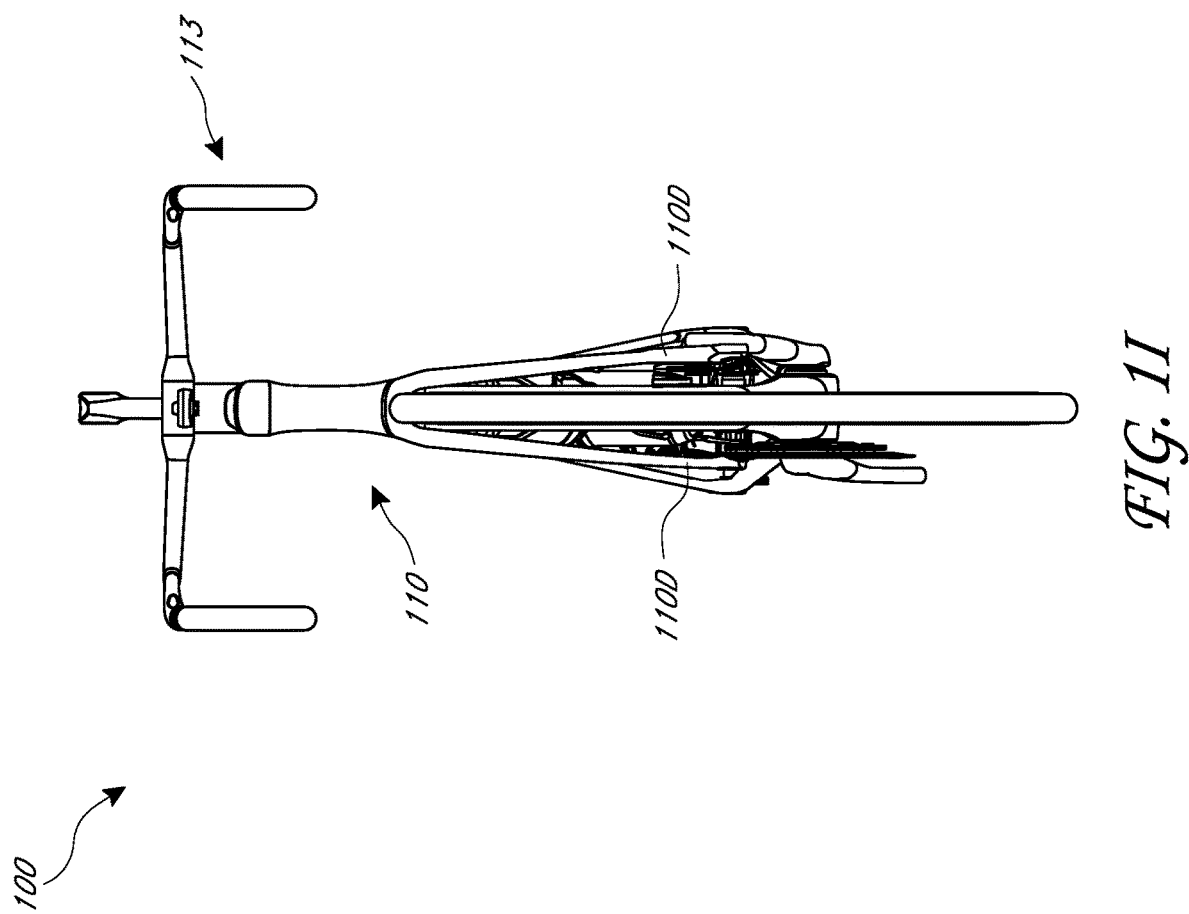
FIG. 1I is a front view of the bicycle of FIG. 1H.
Figure 1J:
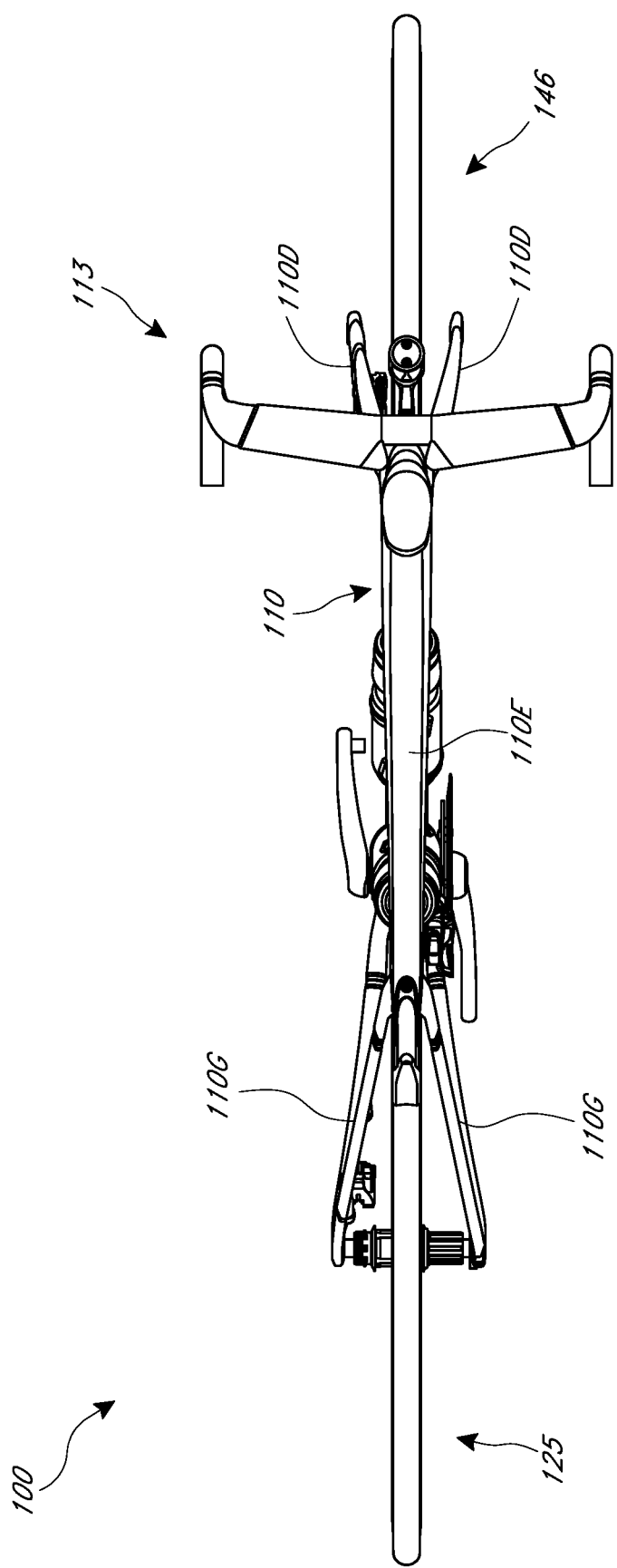
FIG. 1J is a top view of the bicycle of FIG. 1H.
Figure 1K:
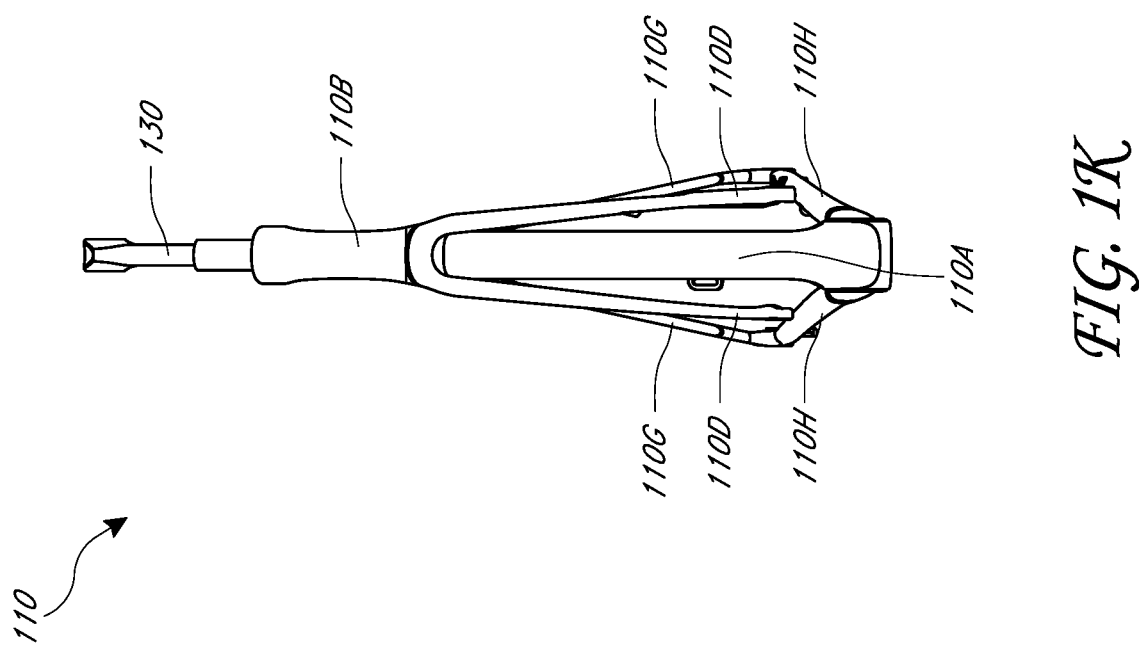
FIGS. 1K, 1L and 1M are front, side and top views of the frame from FIG. 1H.
Figure 1L:
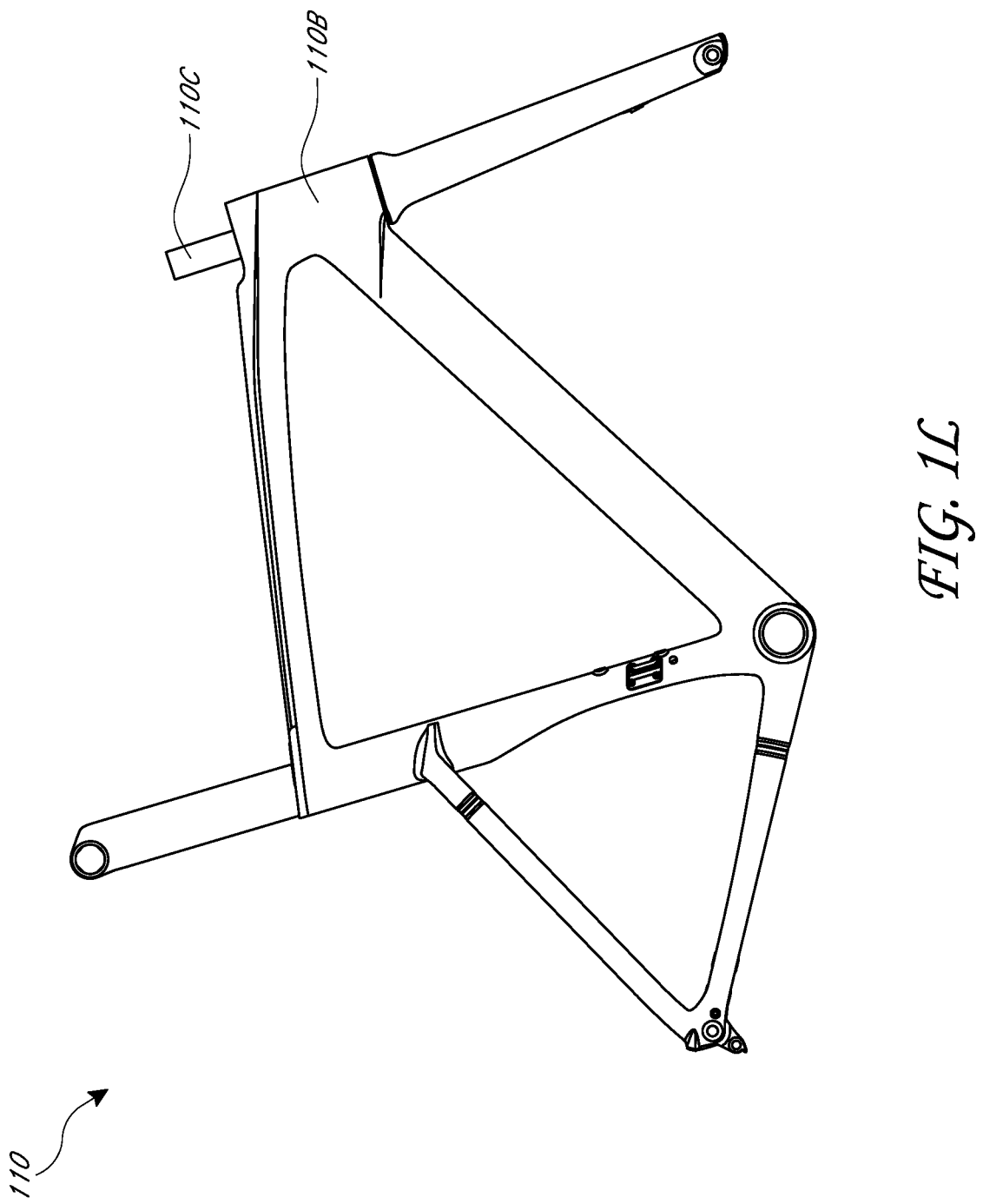
Figure 1M:
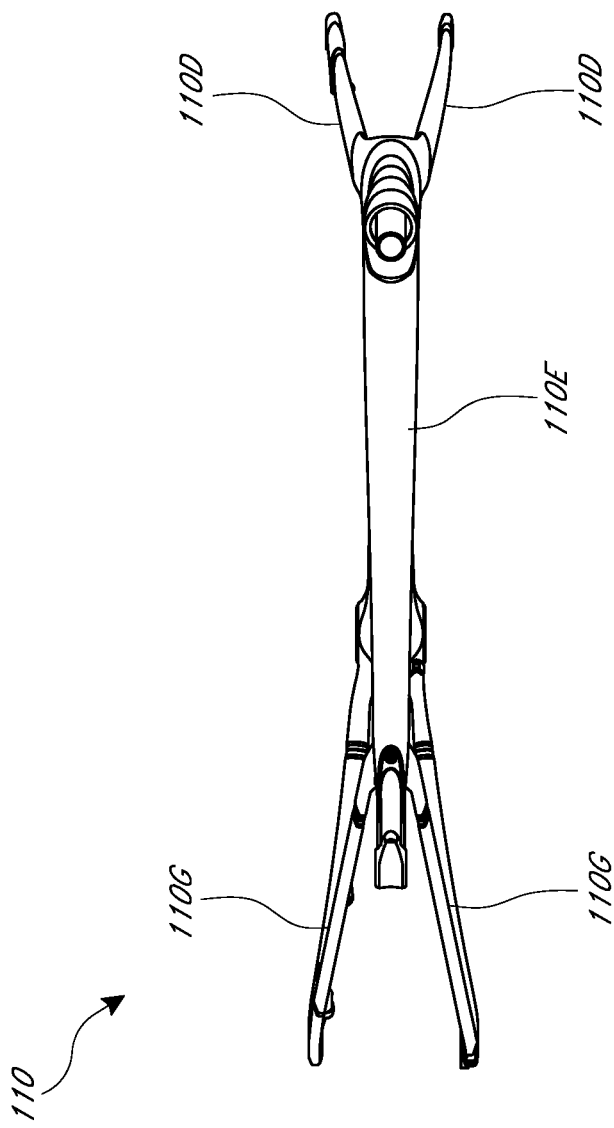

FIG. 1G is a side view of the frame 110 and shows geometric planes through which perpendicular cross-sectional cuts may be made as a design reference for the frame 110 members. The planes are perpendicular to local longitudinal axes of the individual frame 110 members. As shown, the upper seat tube portion 132 may extend longitudinally along an axis 133 and a plane 119 may extend perpendicularly to the axis 133. One of the seat stays 110G may extend longitudinally along an axis 111 and a plane 121 may extend perpendicularly to the axis 111. The other seat stay 110G, not visible in the figure, but which may be a mirror image of the other seat stay 110G about the XZ plane and have a similar axis and plane. The down tube 110A may extend longitudinally along an axis 115 and a plane 123 may extend perpendicularly to the axis 115. The fork 110D may extend longitudinally along an axis 117 and a plane 127 may extend perpendicularly to the axis 117. The other fork 110D not visible in the figure, but which may be a mirror image of the other fork 110D about the XZ plane and may have a similar axis and plane.

The resulting cross-sections as taken along the planes indicated in FIG. 1G may have various design parameters or ranges of design parameters. Each of the cross-sections may have a maximum length (e.g. along a major axis) that is no more than three times a maximum width (e.g. along a minor axis that is shorter than the major axis) of the cross-section.

FIG. 1H is a side view of the bicycle 100 with some components removed for clarity. FIG. 1I is a front view of the bicycle 100 of FIG. 1H. FIG. 1J is a top view of the bicycle 100 of FIG. 1H. The bicycle 100 shown in FIGS. 1H-1J may have the same features and/or functionalities as the bicycle 100 shown and described with respect to FIG. 1A, and vice versa.

The bicycle 100 in FIG. 1H is shown without a seat for clarity. The lower support 134 may extend upward from the frame 110 and be moveable into and out of the top portion of the seat tube 110F. The lower support 134 may have the various cross-sectional profiles described herein. The stem 110C may be configured as shown and extend upward from the head tube 110B.

FIGS. 1K, 1L and 1M are front, side and top views of the frame 110 from FIG. 1H. The frame 110 shown in FIGS. 1K-1M may have the same features and/or functionalities as the frame 110 shown and described with respect to FIG. 1A-1G, and vice versa. Thus the frame 110 of FIGS. 1K-1M may have the horizontal planes as described for making cross-sectional cuts of the frame to describe the cross-sectional profiles, etc.

Figure 2:
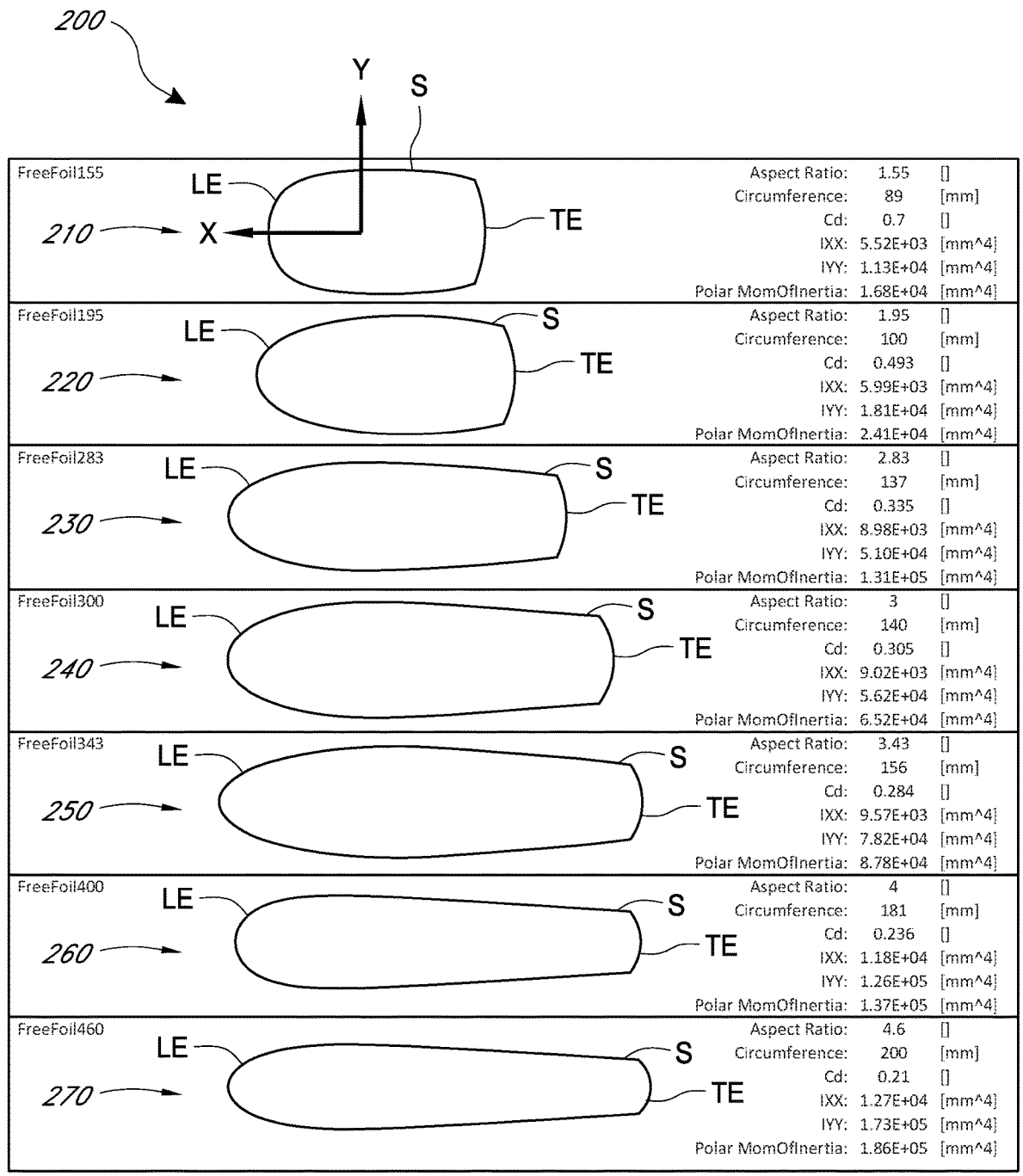
FIG. 2 is a table showing embodiments of cross-sectional profiles that may be used with various members of the frame from FIG. 1A.
Figure 5A:
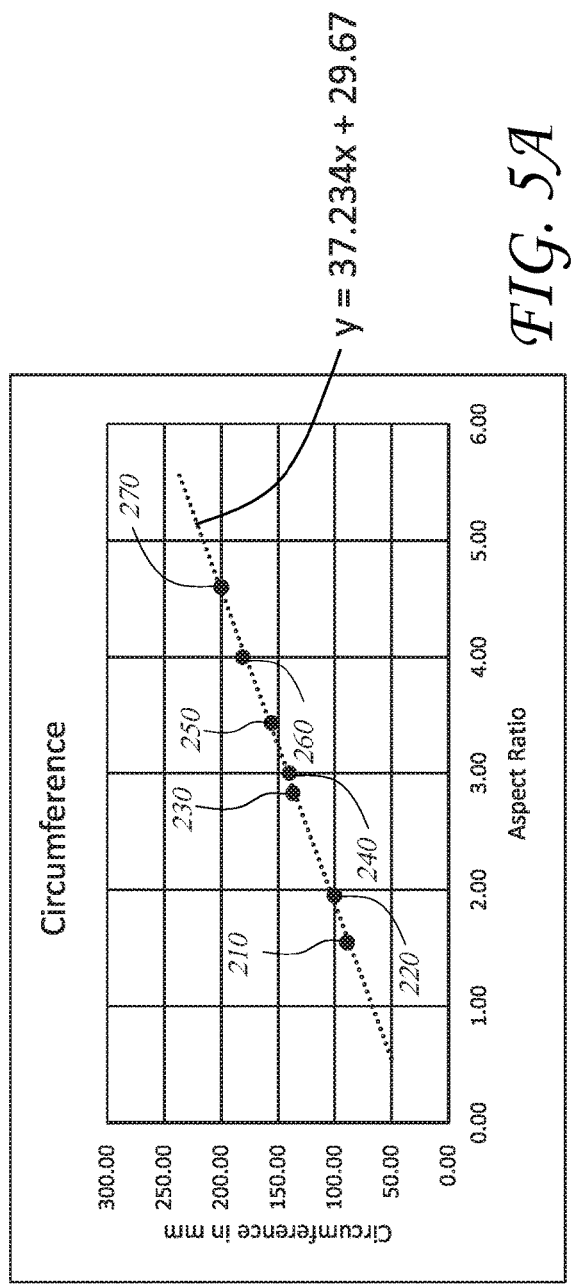
FIGS. 5A-5D are plots showing embodiments of relationships between aspect ratio and, respectively, circumference, drag coefficient, area moment of inertia about the longitudinal X axis, and area moment of inertia about the lateral Y axis, on which cross-sectional profiles of the bicycle of FIG. 1A may be based.
Figure 5B:
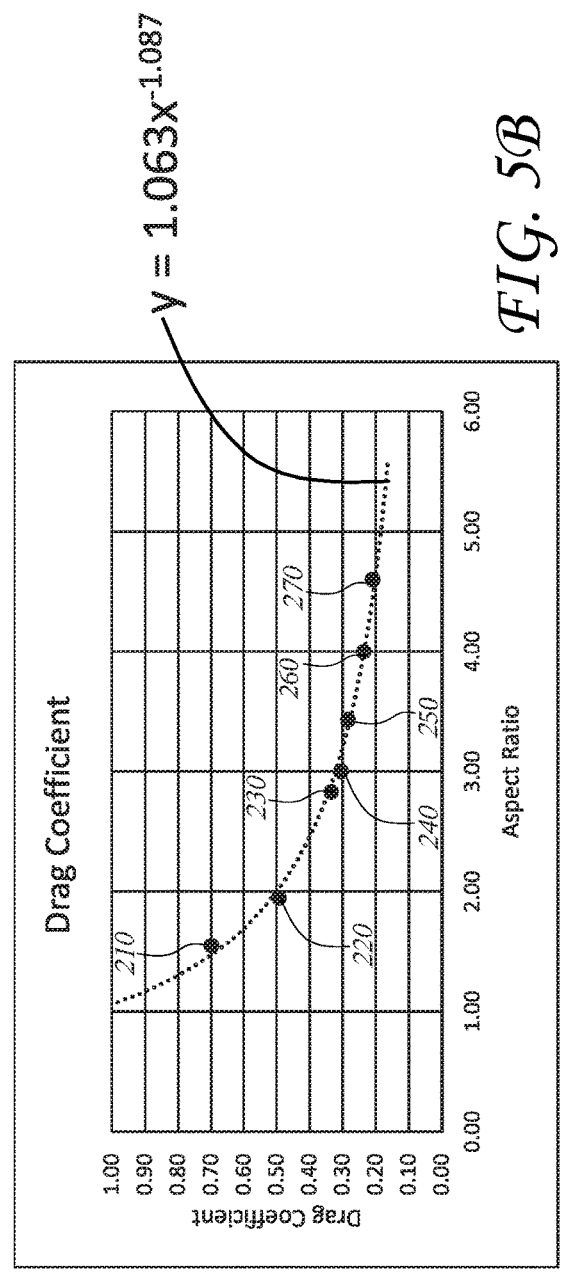
Figure 5C:
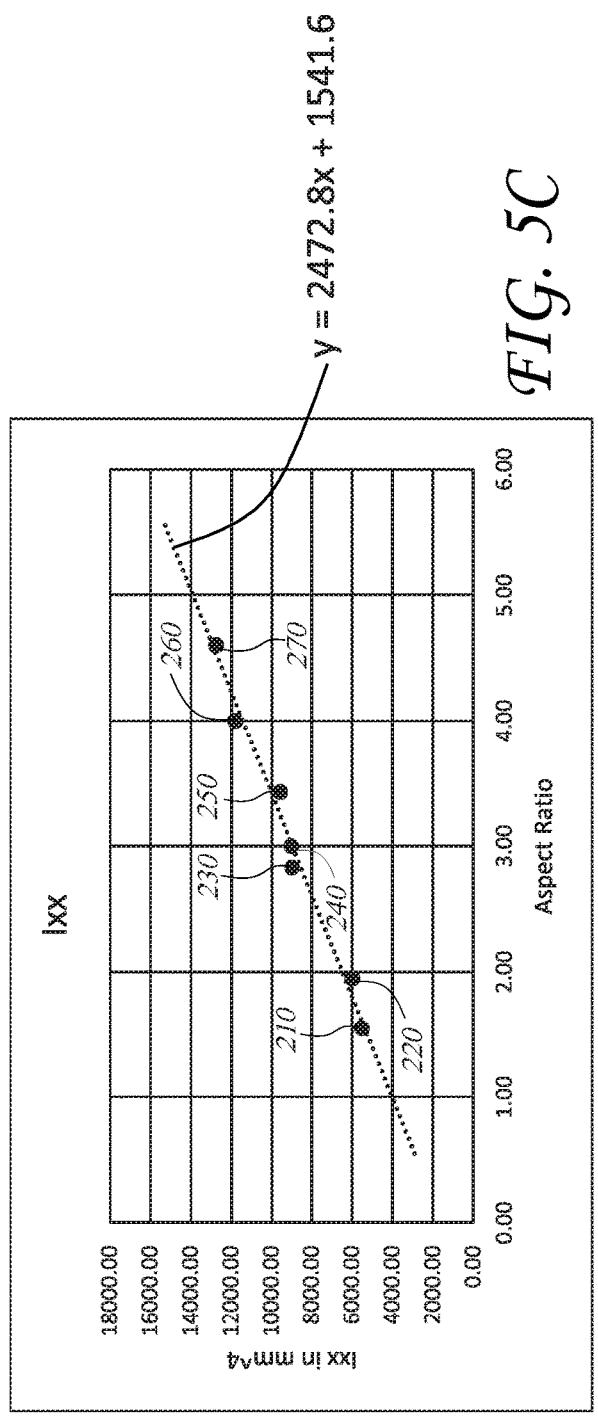
Figure 5D:
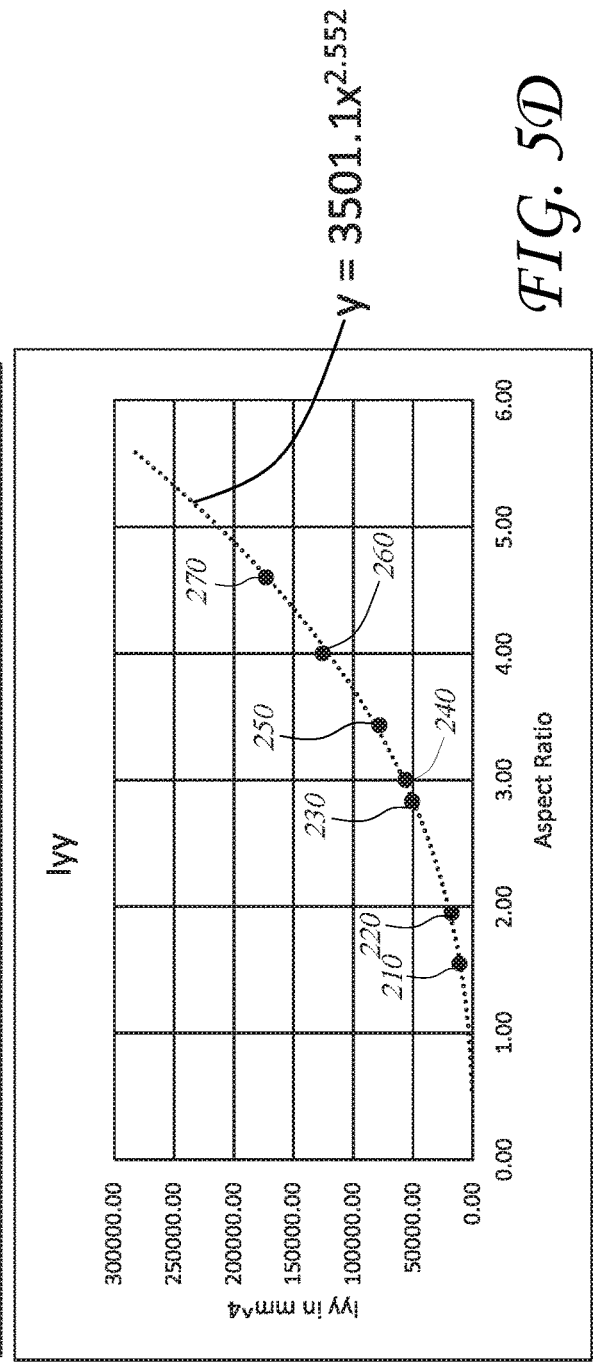
Figure 7A:
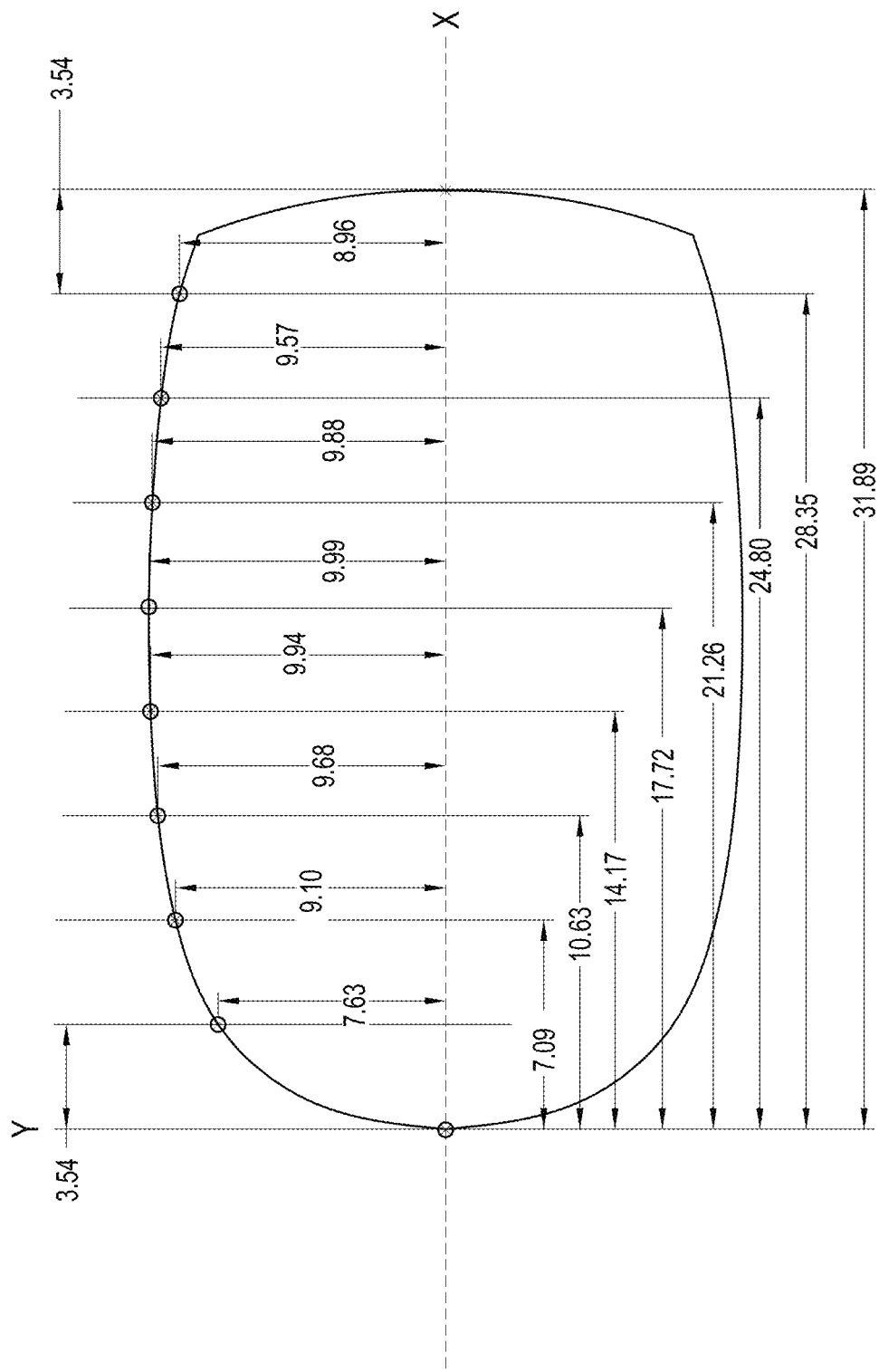
Figure 7B:
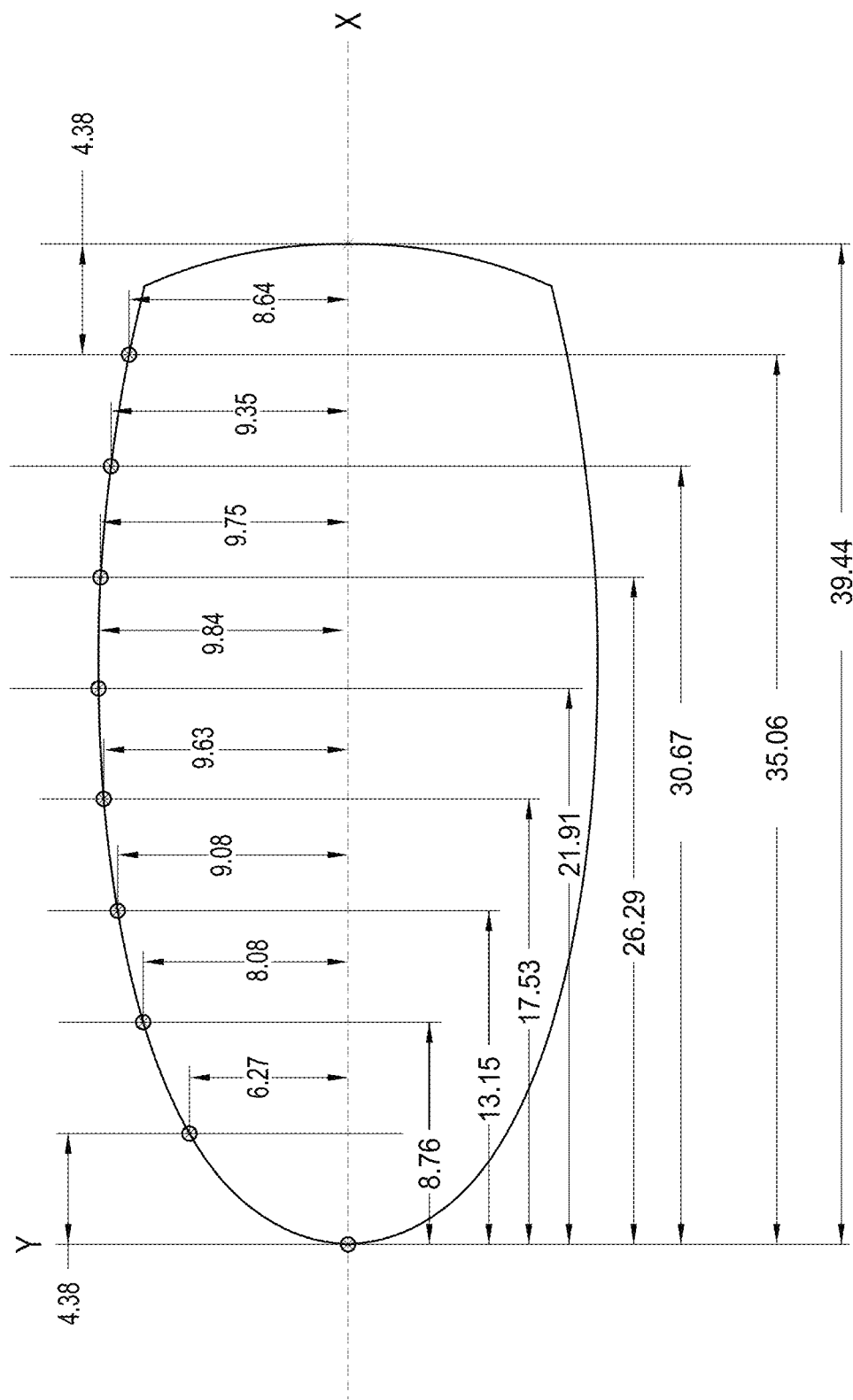
Figure 7C:
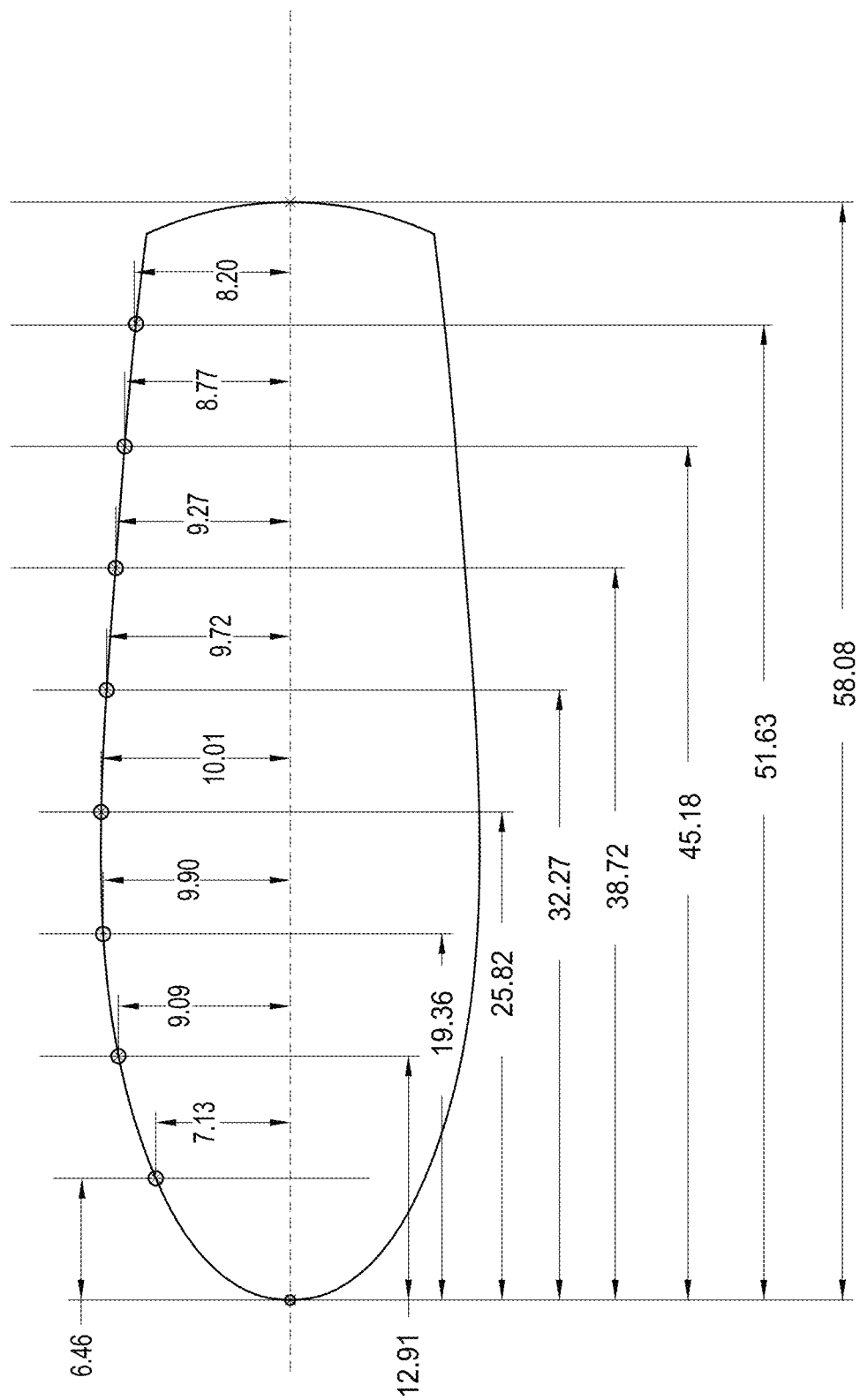
Figure 7D:
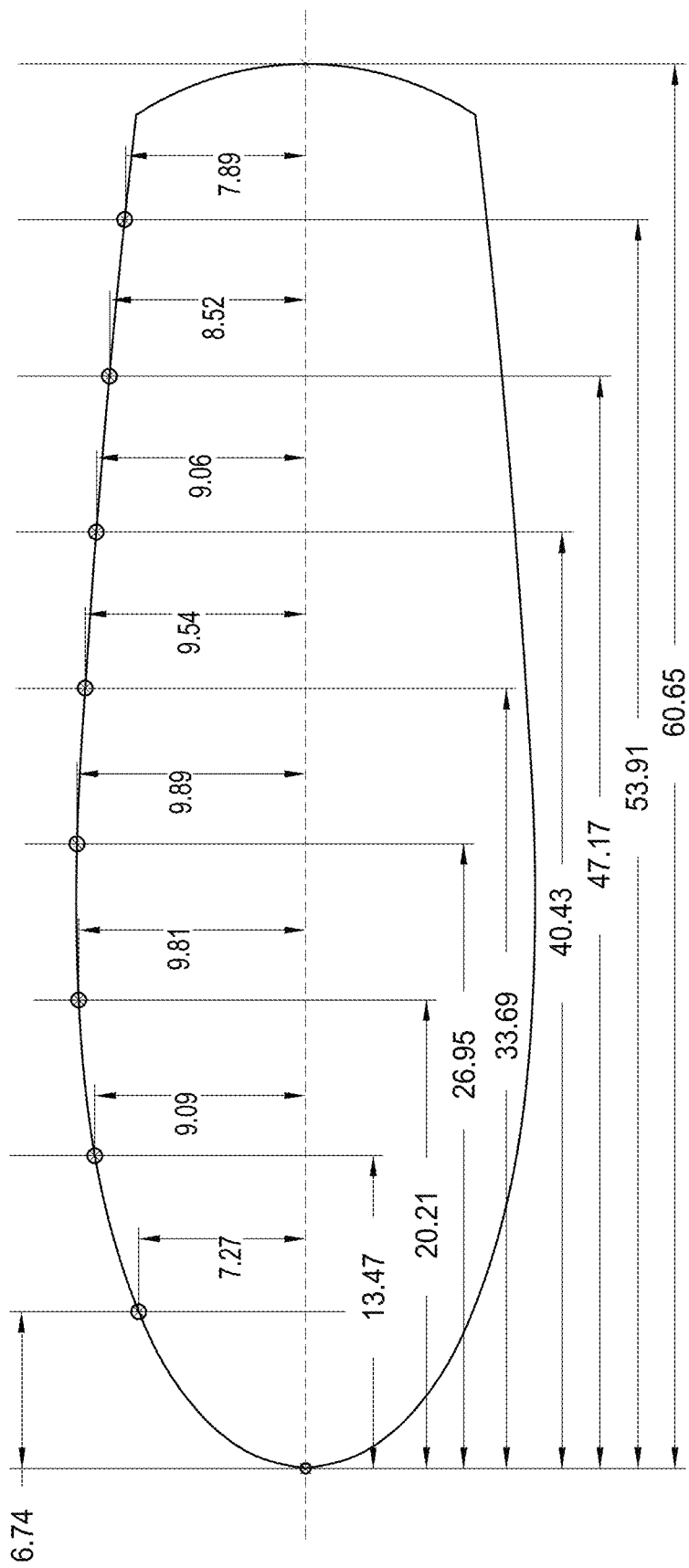
Figure 7F:
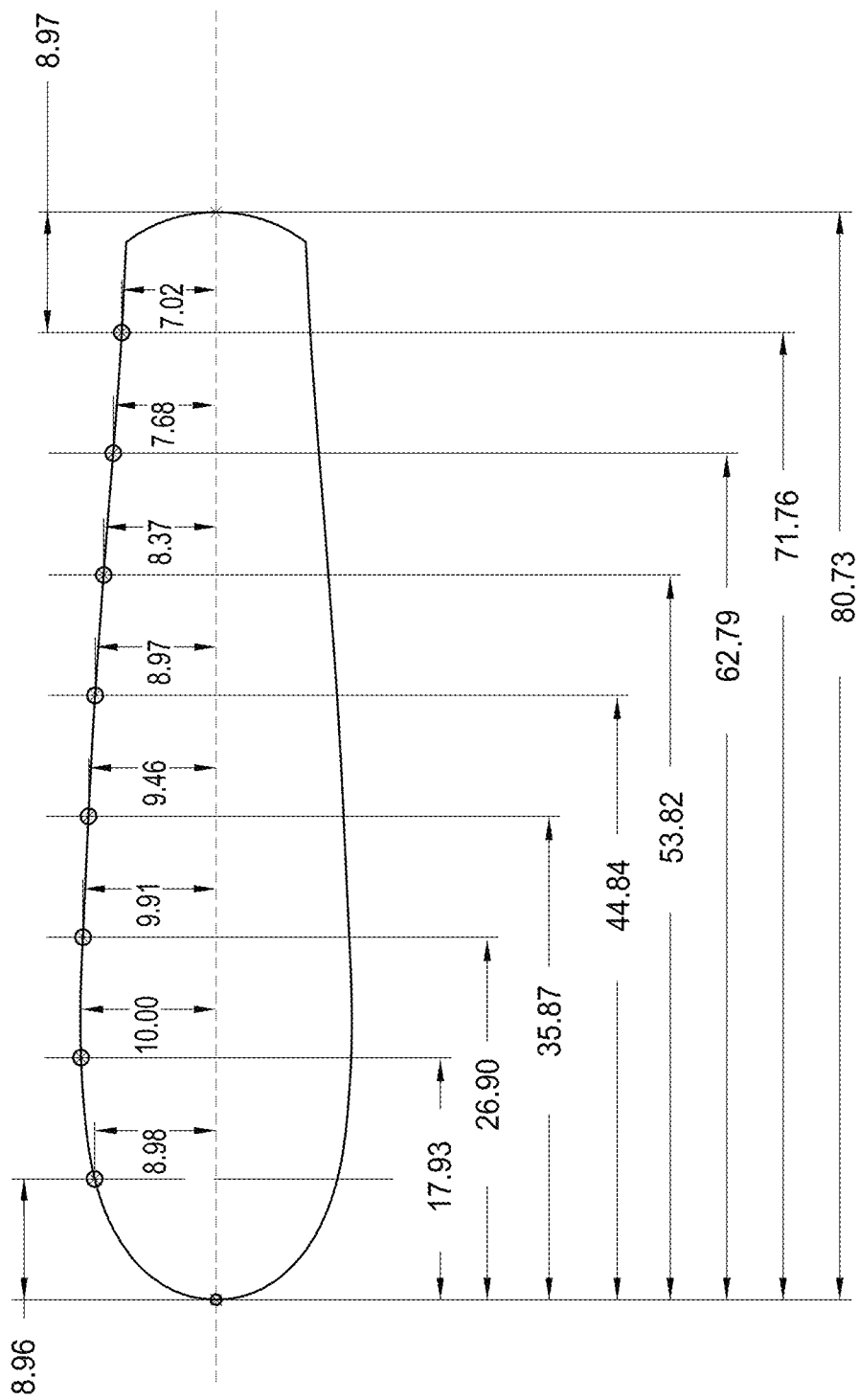
Figure 7G:
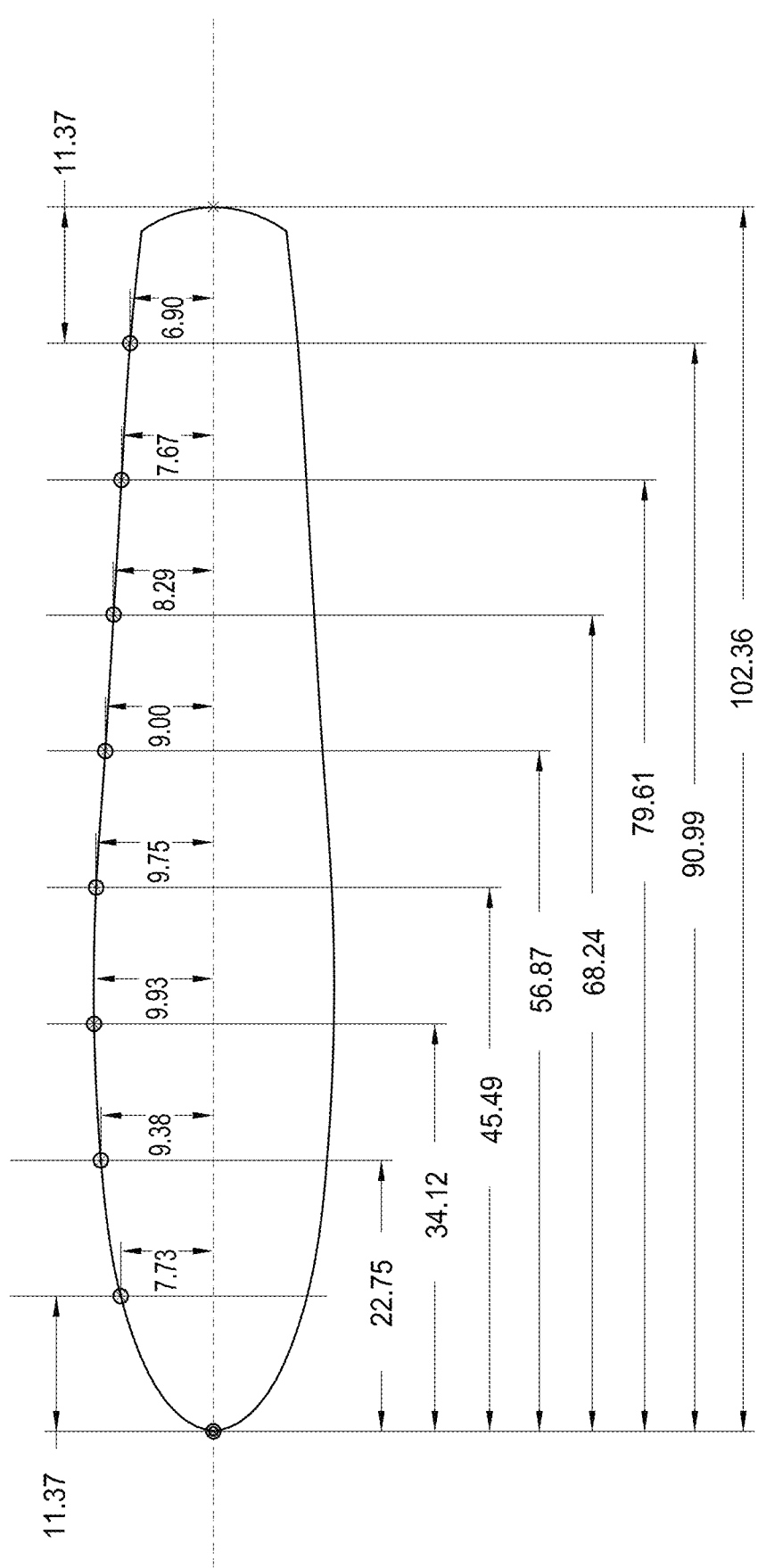
Figure 8A:
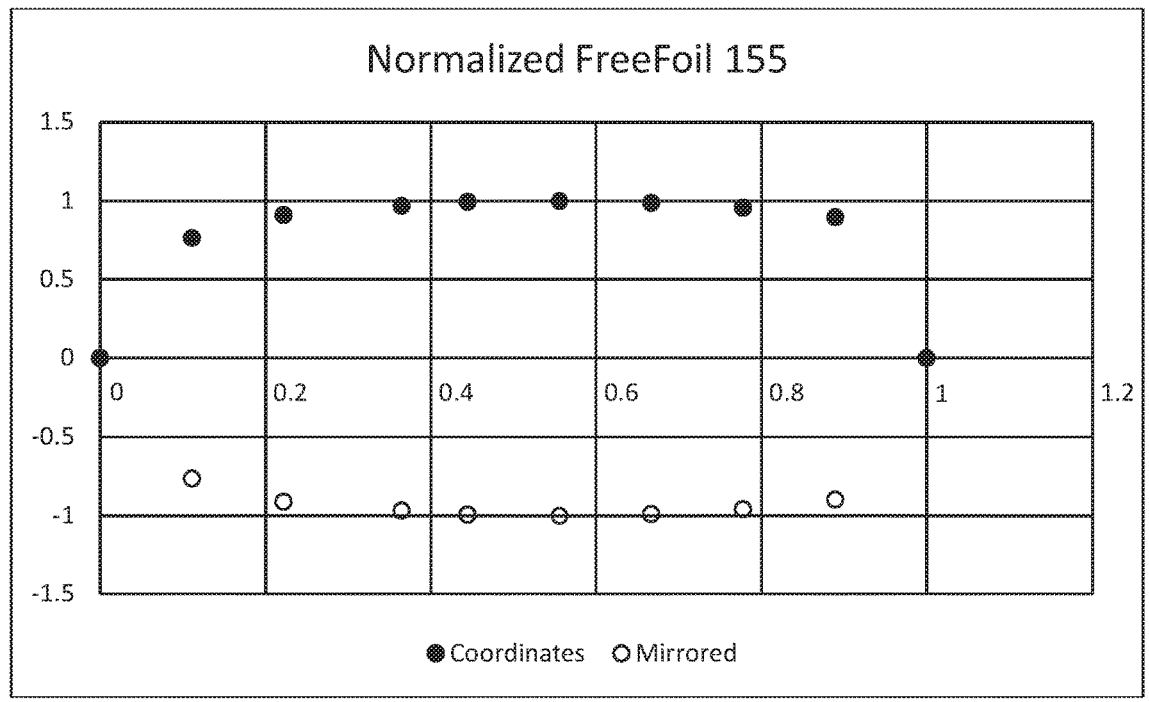
FIGS. 8A-8G are plots of the normalized (dimensionless) coordinates as provided in FIGS. 6A-6G respectively.
Figure 8B:
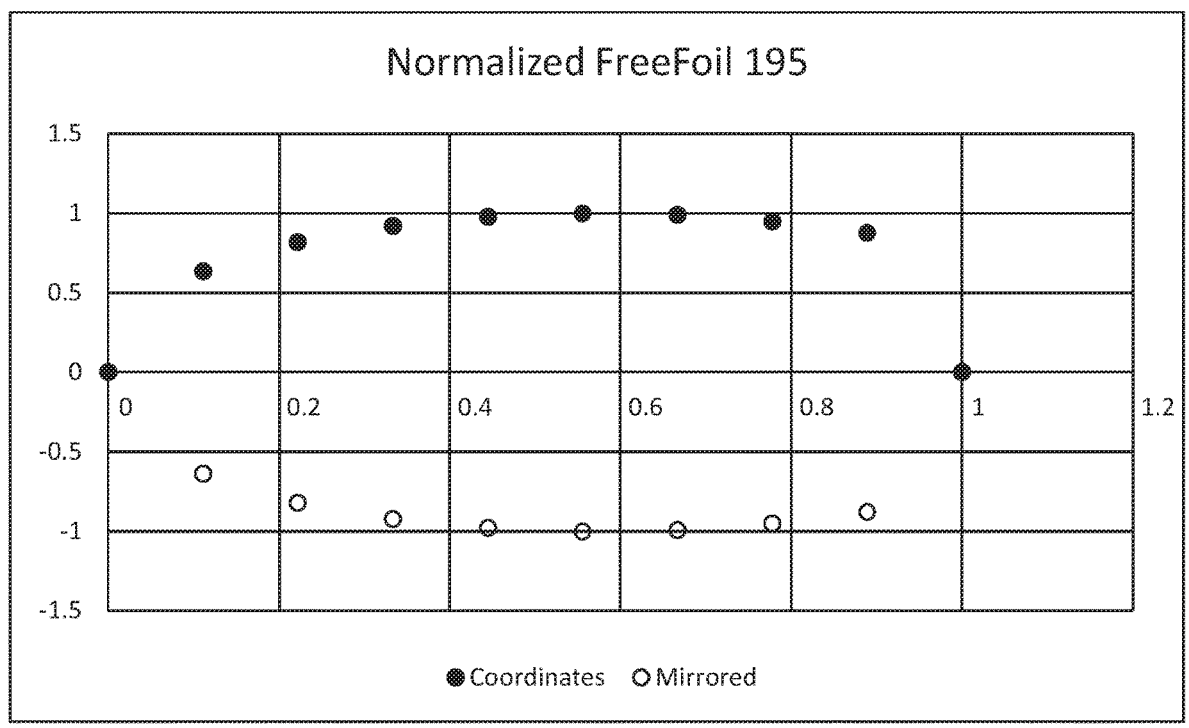
Figure 8C:
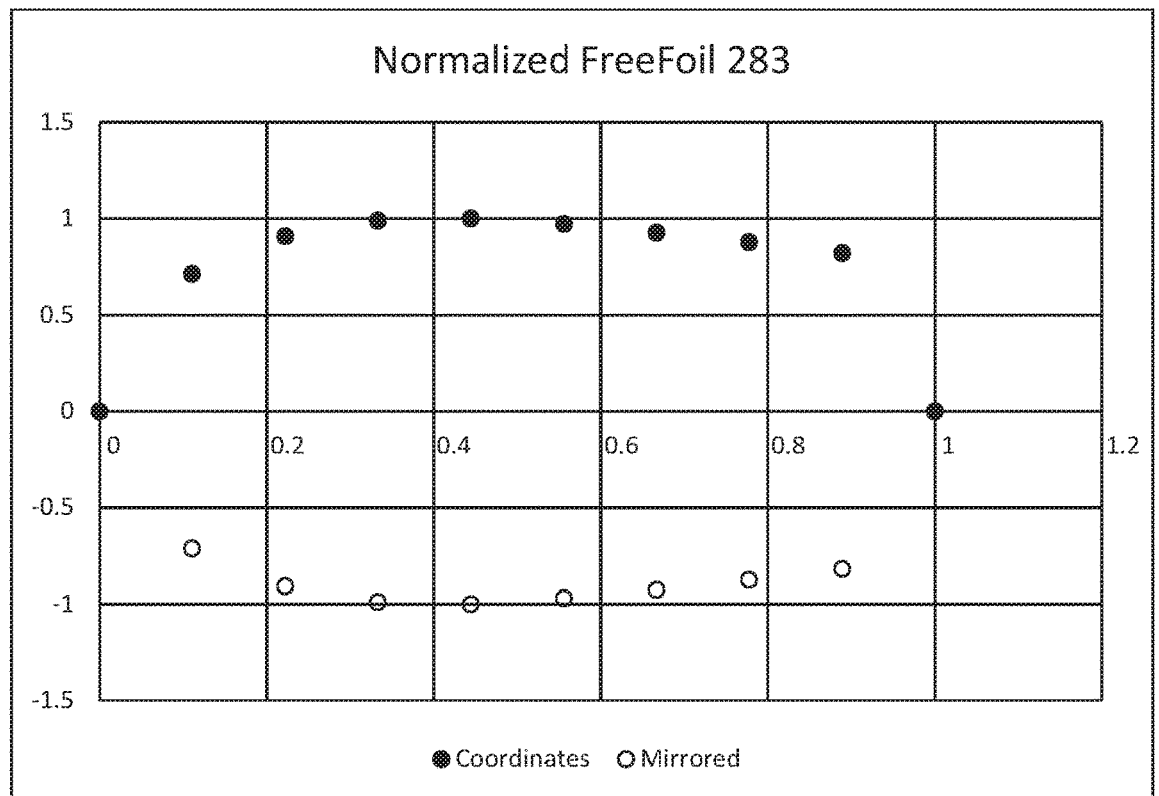
Figure 8D:
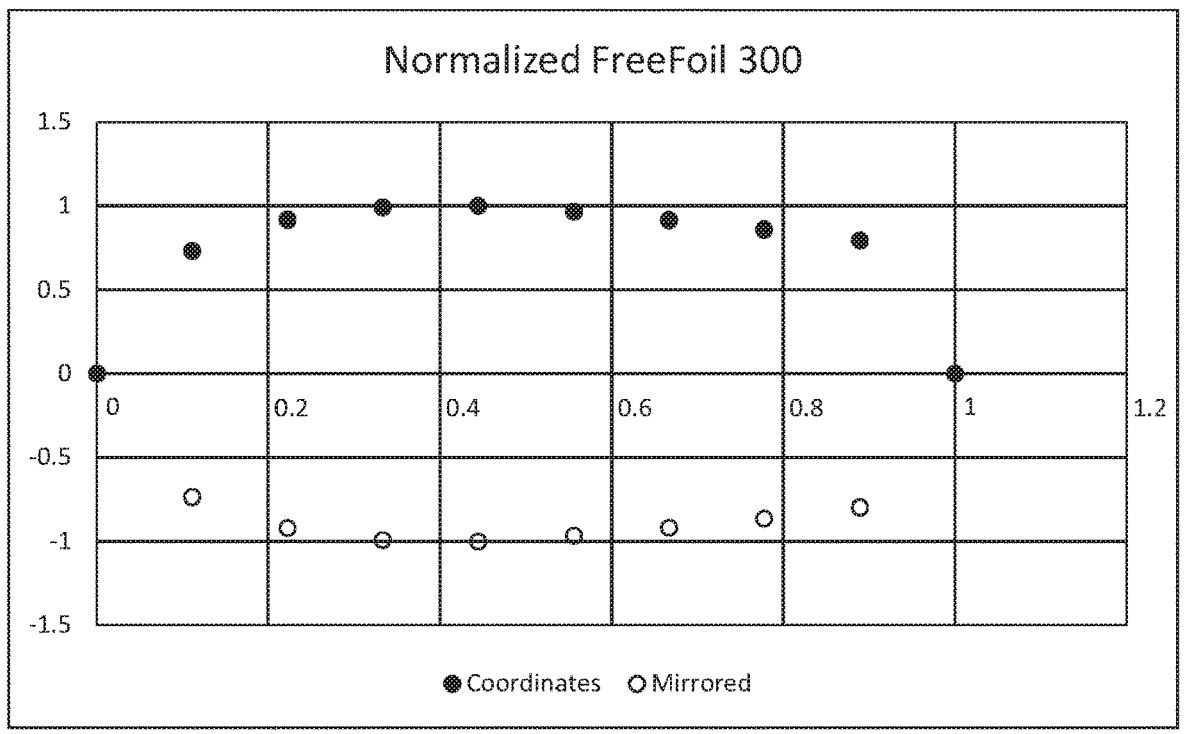
Figure 8E:
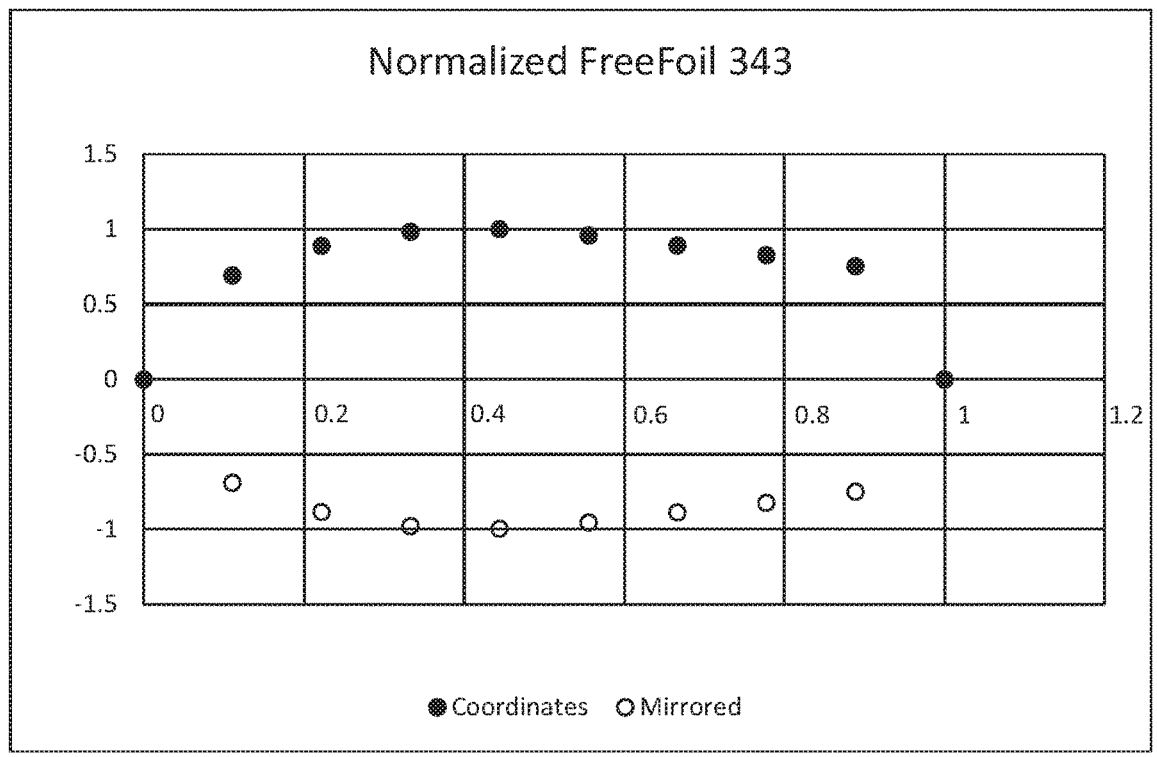
Figure 8F:
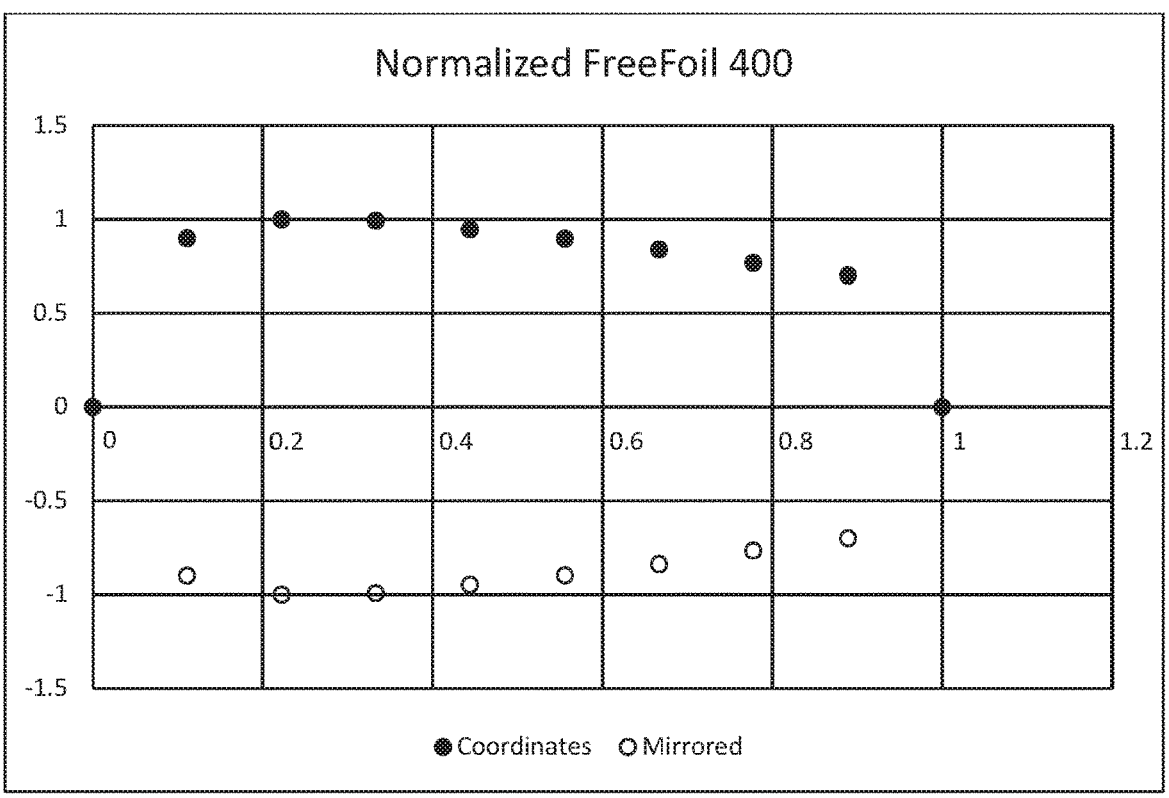
Figure 8G:
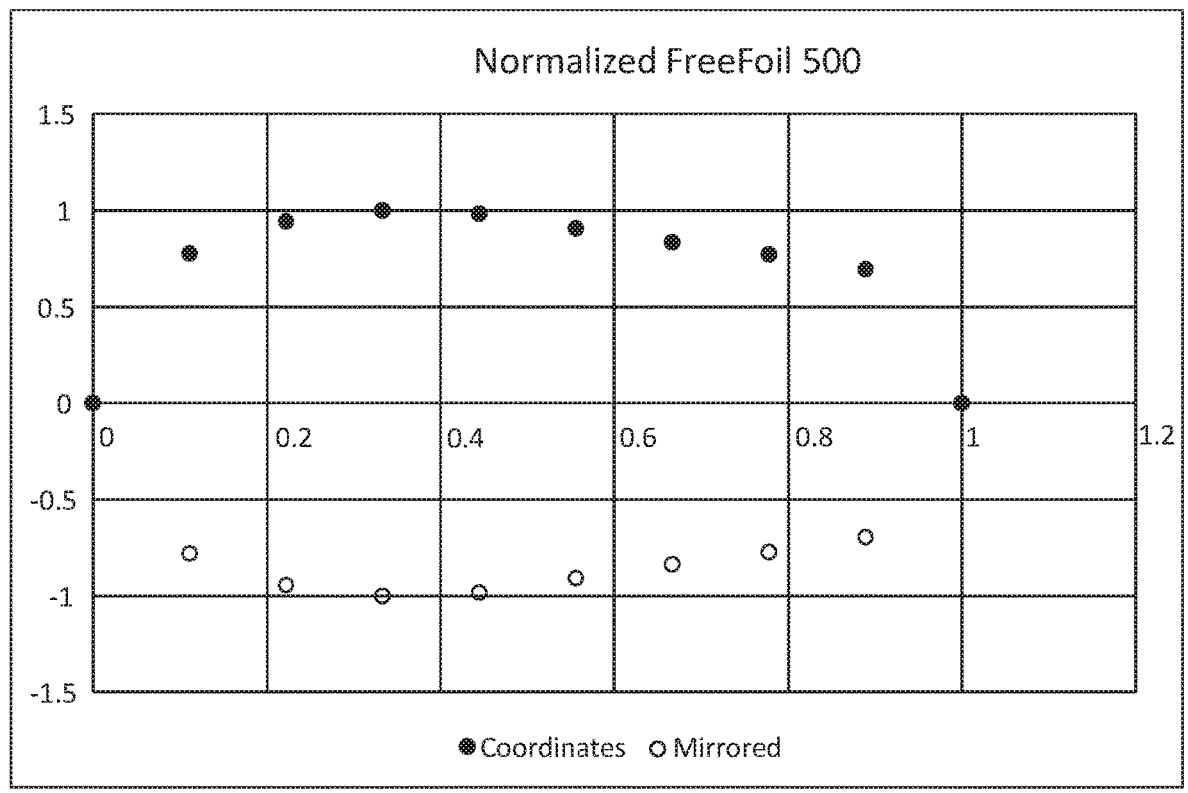

FIG. 2 is a table showing embodiments of cross-sectional profiles that may be used with various members of a frame for a bicycle, such as the members of the frame 110 shown in FIGS. 1A-1F. The cross-sections may be taken along the planes as indicated in FIG. 1B. The particular cross-sectional design may be selected based on the particular member of the frame 110. However, it is understood that one or more of the cross sections may be used for this or other of the members of the frame 110 depending on required design criteria. The cross-sections may be defined according to one or more equations related to various parameters of the cross-sections, as further described. Further, the cross-sections shown are merely examples and others may be used.

As shown in FIG. 2, there are example cross-sections 210, 220, 230, 240, 250, 260 and 270. The cross-sections have a leading edge LE, sides S, and trailing edge TE. The leading edge LE may be a region of the cross section that faces an incoming free stream flow, for example wind or moving atmosphere which may be due to forward movement of the bicycle 100. The trailing edge TE may be located opposite the leading edge LE along the longitudinal X axis, which may align with the X-axis shown in FIG. 1A when the member containing the particular cross-section is assembled with the frame 110. The sides S may be on lateral sides along the lateral Y-axis, which may align with the Y-axis shown in FIG. 1A when the member containing the particular cross-section is assembled with the frame 110. Each side S may extend from the leading edge LE to the trailing edge TE on either side of the cross-section.

The cross-sections are symmetric about the longitudinal X-axis. The sides S may therefore be mirror opposites about the X-axis. The leading and trailing edges LE, TE may be evenly split by the X-axis. In some embodiments, the cross-sections may be approximately symmetric about the X-axis. In some embodiments, the cross-sections may be not be symmetric about the X-axis. For instance, at least a forward portion of the cross-section may be symmetric about the X axis while another rearward portion may not be symmetric. In some embodiments, the first 50%, 60%, 70%, 80% 90%, 95%, 98%, or 99% of the length of the cross-section beginning from the leading edge may be symmetric. In some embodiments, the last 50%, 40%, 30%, 20% 10%, 5%, 2%, or 1% of the length of the cross-section beginning from the leading edge may not be symmetric. An example of a non-symmetric cross-section is shown in FIG. 1F for particular embodiments of the forks 110D.

A particular cross-section may be used for the entirety of the longitudinal length of the particular frame 110 member for which the cross-section is used. In some embodiments, the cross-section may be used for most of the length of the frame 110 member. In some embodiments, the cross-section may be used for 10% or more, 20% or more, 30% or more, 40% or more, 50% or more, 60% or more, 70% or more, 75% or more, 80% or more, 85% or more, 90% or more, 95% or more, 96% or more, 97% or more, 98% or more, or 99% or more of the length of the frame 110 member.

In FIG. 2, various parameters with example values are given for each cross-section. These parameters include the aspect ratio (AR), the circumference (U), the drag coefficient (Cd), the area moment of inertia about the X-axis (Ixx), the area moment of inertia about the Y-axis (Iyy), and the polar moment of inertia. The aspect ratio may be calculated as the ratio of the maximum lateral width of the cross-section to the maximum longitudinal length of the cross-section. The circumference may be the length of the perimeter of the cross-section, which may be the arclength of the leading edge LE plus the arclength of the trailing edge TE plus twice the sum of the side S.

The drag coefficient Cd may be calculated based on a free stream flow of fluid flowing in a direction parallel to the X-axis and in the −X direction as oriented in the figure. Thus the "forward" portion of the bicycle 100 may be to the left as oriented in FIG. 2 such that a forward moving bicycle 100 would experience a relative flow of air in the −X direction. The drag coefficient Cd may be calculated assuming undisturbed or substantially undisturbed flow of air in such direction.

The moments of inertia Ixx, Iyy are "area moments of inertia," sometimes referred to as 2nd moments of area, moments of inertia of plane area, or second area moment. The moments of inertia Ixx, Iyy are geometrical properties of the area of the cross-section which reflects how the cross-section's area is distributed with regard to the X-axis and Y-axis, respectively.

In table 200, the cross-sections 210 to 270 are listed in order from top to bottom row with increasing aspect ratio, circumference, and area moments of inertia, and decreasing drag coefficient. Thus, for example, the cross-section 210 has a lower aspect ratio, circumference, and area moments of inertia, and higher drag coefficient than the cross-section 220, etc.

The various members of the frame 110 may use the cross-sections based on whether structural or aerodynamic requirements are more important. For example, the seat tube 110F experiences high drag forces, so aerodynamic considerations may be more important and lead to selection of a cross-section having a lower drag coefficient.

In some embodiments, the curvature of the cross-sections behind a truncation point may be varied. This may be the portion of the cross-section rearward of the sides S, for example the trailing edge TE. This region may be curved as shown, or it may be straight, segmented, rounded, radiused, other shapes, or combinations thereof. This region may be selected based on fitting into one or more equations for selecting the parameters AR, Ixx, Iyy, Cd and/or U, as further described.

In some embodiments, one, two, three, four or five of the parameters AR, Ixx, Iyy, Cd and/or U may be related to one, two, three, four or five of the other parameters AR, Ixx, Iyy, Cd and/or U for design of the bicycle 100. In some embodiments, selection of an aspect ratio AR or range of aspect ratios AR may be used to define one or more of the other parameters Ixx, Iyy, Cd and/or U.

FIG. 3 is a table showing data for three example embodiments of bicycle frame cross-sectional profiles that may be used with the bicycle frame 110, with corresponding equations, values and/or ranges of values for various parameters for each embodiment. The relations may relate aspect ratio with circumference, drag coefficient, area moment of inertia about the longitudinal X-axis, and/or area moment of inertia about the lateral Y-axis. Each embodiment is shown in a single column and may have an aspect ratio (AR) within the range indicated, and the parameters U, Cd, Ixx and Iyy may be calculated using the equations shown in the corresponding rows for the given column.

As shown, similar base equations may be used for calculating U, Cd, Ixx and Iyy but with bounded ranges. For example, U may be calculated using the same base equation where the first, second and third embodiment is +/−3%, +/−5% and +/−10% respectively within the value calculating using the given equation. Other percentages may be used for this and the other parameters. For one or more or all parameters, the equations shown may be used and bounded within a range using +/−1%, +/−2%, +/−3%, +/−4%, +/−5%, +/−6%, +/−7%, +/−8%, +/−9%, +/−10%, +/−11%, +/−12%, +/−13%, +/−14%, +/−15%, +/−16%, +/−17%, +/−18%, +/−19%, +/−20%, +/−25%, +/−30%, +/−35% or +/−40% of the value resulting from the equation. Some, none, or all of the equations may be applied for a given embodiment within a given column.

The values for drag coefficient and circumference resulting from the equations are representative of a frame member cross-section that is scaled to 20 millimeters (mm) maximum lateral width and, for the area moments of inertia, assuming a wall thickness of 1.25 mm. The criteria may be scaled proportionally as needed to apply to other sizes and shapes of cross-sections. For example, for a bicycle component such as a frame member with a horizontal cross-section having a maximum lateral width of 25 mm, the values for circumference and drag may be scaled by 25/20, or 1.25. As further example, for a bicycle component such as a frame member with a horizontal cross-section having a wall thickness of 1.5 mm, a scaling factor of 1.5/1.25, or 1.2, may be used.

The parameter Cd may be used for fluid flows having a Reynolds number from about 5000-100,000. The parameter Cd may be calculated using these Reynolds numbers for a flow field having a speed relative to the bicycle from about 5 miles per hour to about 50 miles per hour.

FIG. 4 is a table showing example calculations for various parameters based on the equations in the table of FIG. 3 for the cross-sections of FIG. 2. Each column represents a selected set of design parameters for the given cross-section 210, 220, 230, 240, 250, 260 and 270. The example calculations indicate proximity of the chosen design parameters to the predicted value based on the equation for that parameter, which equations are shown in FIG. 3. For example, for the column for the cross-section 210 with aspect ratio 1.55, etc., the approximations for U, Cd, Ixx and Iyy are given respectively as "% Resid U," "% Resid Cd," "% Resid XX," and "% Resid YY." For instance, using the equation for U from FIG. 3, namely U=37.234×AR+29.67, the cross-section 210, scaled to have a width of 20 mm, results in a value for U that is 0.98 or 98% of the selected value 89.00 mm. Similar comparisons are shown in that same column for Cd, Ixx and Iyy for the cross-section 210. Similar comparisons are shown in the other columns for the other cross-sections 220, 230, 240, 250, 260 and 270.

FIGS. 5A-5D are plots showing embodiments of relationships between aspect ratio and, respectively, circumference, drag coefficient, area moment of inertia about the longitudinal X axis, and area moment of inertia about the lateral Y axis, on which cross-sectional profiles of the bicycle of FIG. 1A may be based. Data points are indicated on each of the plots. The data points 210, 220, 230, 240, 250, 260, 270, 280 correspond to the cross-sections 210, 220, 230, 240, 250, 260, 270, 280 of FIG. 2. The relationship between aspect ratio and the various parameters can be implemented into the design of these and other cross-sections. For example, a cross-section with values for circumference, drag, and/or moments of inertia that is/are in between the values for the cross-section 210 and the cross-section 220 may be used by identifying a portion of the line in between the data points 210 and 220. Similar cross-sectional profiles between other data points, or beyond the end data points 210 and 270, may be identified in such manner. Thus a "family" or "library" of designs may be identified using the equations and/or plots described herein. In some embodiments, one, some or all of the relationships shown in FIGS. 5A-5D may be used for a single frame 110 of the bicycle 100. One or more of the components of the bicycle 100 may be designed using the described techniques. In some embodiments, all or most of the components of the bicycle 100 may be designed in such manner. For instance, a single family or library may be used to design a complete frame 110 and/or other components of the bicycle 100. A different family or library may be used in such manner to design other embodiments of the bicycle 100.

FIGS. 6A-6G are tables showing example Cartesian X and Y coordinates along the circumference of cross-sections that may be used with the bicycles described herein, such as the bicycle 100. The sets of coordinates for Tables 6A-6G may correspond respectively to the cross-sections 210, 220, 230, 240, 250, 260, 270 listed in the table 200 of FIG. 2. The first column identifies which data point "N" is given for that row. Each table has N=10 sets of coordinates. Fewer or greater than N=10 data points may be used. The total of N=10 data points is provided merely for description and N may include ten, twenty, thirty, forty, fifty, sixty, seventy, eighty, ninety, one hundred or more data points.

The second and third columns provide X and Y coordinates respectively for the actual size of the cross-section in millimeters. The fourth and fifth columns provide dimensionless X and Y coordinates respectively that are normalized and may be used to define other sizes of cross-sections besides that described in columns two and three. For example, each coordinate in columns four and five may be multiplied by the same factor or number to arrive at an actual set of coordinates in millimeters (or other units). The last column on the far right provides a "mirror" dimensionless coordinate for Y for points on the other side of the cross-section, or mirror coordinates about the longitudinal X axis (as shown, e.g., in FIG. 2 for cross-section 210).

The coordinates for actual (columns two and three) and for normalized (columns four and five) provide coordinates along one half of the cross-section. The origin (0,0) is at the forward-most leading edge of the cross-section, and the coordinates align with the "top" half of the cross-sections as oriented for example in FIG. 2, with the "mirror" coordinates providing the Y coordinate for the "bottom half."

The coordinates may define an outer surface of a cross-section of the bicycle 100 component such as the frame 110 members or other components. The cross-section may be taken along a "horizontal" plane as described herein. A line of best fit may be determined using these data points to define other portions of the profile. Other data points may be determined using such line of best fit. The origin for the Cartesian coordinate system (0,0) may be located at the forward-most point of the leading edge of the cross-section.

One or more coordinates at or near the trailing edge TE may not be used in some embodiments. The shape of the trailing edge TE may be changed from the particular configurations shown and described herein and still fall within the scope of the disclosure, and thus still provide the enhanced performance characteristics, etc. For example, coordinates marked with an asterisk (*) may be optional in some embodiments. In some embodiments, coordinate N=10 may not be used. In some embodiments, more than N=10 may not be used. For example, N=5, N=6, N=7, N=8, N=9 and/or N=10 may not be used, as just one example.

In some embodiments, estimates for the shown data points may be used and still fall within the scope of the disclosure. For example, FIG. 6A lists the N=2 actual data point as (3.54, 7.63). In some embodiments, the actual data point used for N=2 may be (3.5, 7.6), or other approximations of the coordinate shown in the table. Similarly, for the dimensionless coordinates, approximations may be used. For example, in FIG. 6A, the N=2 dimensionless data point is shown as (0.111007, 0.763764). In some embodiments, the mirror data point used for N=2 may be (0.11100, 0.76376), (0.1110, 0.7637), (0.111, 0.763), (0.11, 0.76), (0.1, 0.7), or other approximations of the coordinate shown in the table.

FIGS. 7A-7G are plots of the actual coordinates (X,Y) as provided in FIGS. 6A-6G respectively. The lines shown for the contours are approximations. The contours in FIGS. 7A-7G may be the same or similar as the cross-sectional contours shown in FIG. 2 for cross-sections 210, 220, 230, 240, 250, 260, 270, respectively.

FIGS. 8A-8G are plots of the normalized (dimensionless) coordinates as provided in FIGS. 6A-6G respectively. The "mirror" data points are also indicated by the open circle data points below the X axis.

Some embodiments include a method of manufacturing a bicycle. For example, the bicycle can be similar or identical to bicycle 100 (FIG. 1). Further, the method of manufacturing the bicycle can comprise an activity of manufacturing a frame. For example, the frame can be similar or identical to frame 110 (FIG. 1).

Further, the activity of manufacturing the frame can comprise one or more of (i) an activity of manufacturing a down tube, (ii) an activity of manufacturing a head tube, (iii) an activity of manufacturing a stem, (iv) an activity of manufacturing forks, (v) an activity of manufacturing a top tube, (vi) an activity of manufacturing a seat tube, (vii) an activity of manufacturing seat stays, and/or (viii) an activity of manufacturing chain stays. For example, the frame can comprise the down tube, the head tube, the stem, the forks, the top tube, the seat tube, the seat stays, and/or the chain stays. In these embodiments, the down tube can be similar or identical to the down tube 110A (FIG. 1); the head tube can be similar or identical to the head tube 110B (FIG. 1); the stem can be similar or identical to the stem 110C (FIG. 1); the forks can be similar or identical to the forks 110D (FIG. 1); the top tube can be similar or identical to the top tube 110E (FIG. 1); the seat tube can be similar or identical to the seat tube 110F; the seat stays can be similar or identical to the seat stays 110G (FIG. 1); and/or the chain stays can be similar or identical to the chain stays 110H (FIG. 1). In these or other embodiments, two or more of the activities can be performed simultaneously.

In some embodiments, the activity of manufacturing the frame (and/or one or more of the activities included therein) can be performed using one or more material manufacturing processes (e.g., casting, imaging and coating (e.g., printing), molding, forming, machining, joining, etc.). The material manufacturing process(es) implemented can depend, at least in part, on the material(s) used for the frame (and the components of the frame). Exemplary material(s) may include one or more metals (e.g., steel, aluminum, etc.), one or more composite materials (e.g., metal alloy, carbon fiber reinforced polymer, etc.), etc.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, as further discussed above, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in one or more suitable sub combinations. Moreover, although features may be described above as acting in certain combinations and even initially claimed as such, one or more features from a claimed combination can in some cases be excised from the combination, and the claimed combination may be directed to a sub combination or variation of a sub combination.

In describing the present technology, the following terminology may have been used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. For brevity, as used herein, units of measurement may sometimes be abbreviated. For example, units of measurement of the International System of Units may be abbreviated using abbreviations conventionally used in connection with units of measurement of the International System of Units.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as 1-3, 2-4 and 3-5, etc. This same principle applies to ranges reciting only one numerical value (e.g., "greater than about 1") and should apply regardless of the breadth of the range or the characteristics being described.

A plurality of items may be presented in a common list for convenience. However, these lists should be construed as though each member of the list is individually identified as a separate and unique member. Thus, no individual member of such list should be construed as a de facto equivalent of another member of the same list solely based on their presentation in a common group without indications to the contrary. Furthermore, where the terms "and" and "or" are used in conjunction with a list of items, they are to be interpreted broadly, in that one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects, and advantages are necessarily required to practice the present invention. Accordingly, the scope of the present invention is intended to be defined only by the claims that follow.

What is claimed is:

1. A frame for a bicycle, the frame comprising:
an elongated first member with a first cross-section, the first cross-section taken along a first horizontal plane and extending longitudinally along an X axis and laterally along a Y axis perpendicular to the X axis, the first horizontal plane containing the X and Y axes, wherein the bicycle is configured to travel forward in a direction that aligns with the X axis, the first cross-section being scaled proportionally to have a maximum lateral width of 20 millimeters (mm) and having an aspect ratio (AR) defined as a ratio of the maximum lateral width to a maximum longitudinal length of the first cross-section, a circumference within +/−10% of U where U=37.234×AR+29.67 mm, a drag coefficient within +/−15% of Cd where Cd=1.0627×AR$^{-1.087}$, and an area moment of inertia about the X axis within +/−20% of Ixx where Ixx=2472.8×AR+1541.6 mm$^4$.

2. The frame of claim 1, wherein the aspect ratio is between 1.1 and 5.

3. The frame of claim 1, wherein the circumference is within +/−5% of U.

4. The frame of claim 1, wherein the drag coefficient is within +/−6% of Cd.

5. The frame of claim 1, wherein the area moment of inertia about the X axis is within +/−7% of Ixx.

6. The frame of claim 1, wherein an area moment of inertia about the Y axis is within +/−20% of Iyy, where Iyy=(3501.1×AR+2.552) mm$^4$.

7. The frame of claim 1, wherein the drag coefficient is calculated based on an air flow having a speed relative to the frame from about 5 miles per hour to 50 miles per hour and having a Reynolds number from 5,000 to about 100,000.

8. The frame of claim 1, wherein the elongated first member comprises a down tube, a fork, a seat stay, or a seat tube.

9. The frame of claim 1, the first cross-section being scaled proportionally to have a wall thickness of 1.25 mm.

10. A frame for a bicycle, the frame comprising:
an elongated first member with a first cross-section, the first cross-section taken along a first horizontal plane and extending longitudinally along an X axis and laterally along a Y axis perpendicular to the X axis, the first horizontal plane containing the X and Y axes, wherein the bicycle is configured to travel forward in a direction that aligns with the X axis, the first member having a drag coefficient no greater than 0.7, wherein the drag coefficient is calculated based on an air flow having a speed relative to the frame from 5 miles per hour to 50 miles per hour and having a Reynolds number from 5,000 to 100,000.

11. The frame of claim 10, wherein the drag coefficient is no greater than 0.5.

12. The frame of claim 10, wherein the drag coefficient is no greater than 0.35.

13. The frame of claim 10, wherein the drag coefficient is no greater than 0.25.

14. The frame of claim 10, the first cross-section being scaled proportionally to have a maximum lateral width of 20 millimeters (mm) and having an aspect ratio (AR) defined as a ratio of the maximum lateral width to a maximum longitudinal length of the first cross-section, and a circumference within +/−10% of U where U=37.234×AR+29.67 mm.

15. The frame of claim 10, the first cross-section being scaled proportionally to have a maximum lateral width of 20 millimeters (mm) and having an aspect ratio AR defined as a ratio of the maximum lateral width to a maximum longitudinal length of the first cross-section, and an area moment of inertia about the X axis within +/−20% of Ixx where Ixx=2472.8×AR+1541.6 mm$^4$.

16. The frame of claim 10, the first cross-section being scaled proportionally to have a wall thickness of 1.25 mm.

17. A frame for a bicycle, the frame comprising:
a frame having an elongated first member with a first cross-section, the first cross-section taken along a first horizontal plane and extending longitudinally along an X axis and laterally along a Y axis perpendicular to the X axis, the first horizontal plane containing the X and Y axes, wherein the bicycle is configured to travel forward in a direction that aligns with the X axis, the first cross-section being scaled proportionally to have a maximum lateral width of 20 millimeters having a profile substantially in accordance with Cartesian coordinate values of X and Y set forth in any one of Tables 6A-6G below for data points N=2 through N=7:

TABLE 6A

FreeFoil 155

| | Actual [mm] | | Normalized [-] | | |
|---|---|---|---|---|---|
| N | x | y | x | y | Mirror y |
| 1 | 0 | 0 | 0 | 0 | 0 |
| 2 | 3.54 | 7.63 | 0.111007 | 0.763764 | −0.76376 |
| 3 | 7.09 | 9.1 | 0.222327 | 0.910911 | −0.91091 |
| 4 | 11.63 | 9.68 | 0.364691 | 0.968969 | −0.96897 |
| 5 | 14.17 | 9.94 | 0.44434 | 0.994995 | −0.99499 |
| 6 | 17.72 | 9.99 | 0.55566 | 1 | −1 |
| 7 | 21.26 | 9.88 | 0.666667 | 0.988989 | −0.98899 |
| 8 | 24.8 | 9.57 | 0.777673 | 0.957958 | −0.95796 |
| 9 | 28.35 | 8.96 | 0.888993 | 0.896897 | −0.8969 |
| 10* | 31.89 | 0 | 1 | 0 | 0 |

TABLE 6B

FreeFoil 195

| | Actual [mm] | | Normalized [-] | | |
|---|---|---|---|---|---|
| N | x | y | x | y | Mirror y |
| 1 | 0 | 0 | 0 | 0 | 0 |
| 2 | 4.38 | 6.27 | 0.111055 | 0.637195 | −0.6372 |
| 3 | 8.76 | 8.08 | 0.22211 | 0.821138 | −0.82114 |
| 4 | 13.15 | 9.08 | 0.333418 | 0.922764 | −0.92276 |
| 5 | 17.53 | 9.63 | 0.444473 | 0.978659 | −0.97866 |
| 6 | 21.91 | 9.84 | 0.555527 | 1 | −1 |
| 7 | 26.29 | 9.75 | 0.666582 | 0.990854 | −0.99085 |
| 8 | 30.67 | 9.35 | 0.777637 | 0.950203 | −0.9502 |
| 9 | 35.06 | 8.64 | 0.888945 | 0.878049 | −0.8780S |
| 10* | 39.44 | 0 | 1 | 0 | 0 |

TABLE 6C

FreeFoil 283

| | Actual [mm] | | Normalized [-] | | |
|---|---|---|---|---|---|
| N | x | y | x | y | Mirror y |
| 1 | 0 | 0 | 0 | 0 | 0 |
| 2 | 6.46 | 7.13 | 0.111226 | 0.712288 | −0.71229 |
| 3 | 12.91 | 9.09 | 0.22228 | 0.908092 | −0.90809 |
| 4 | 19.36 | 9.9 | 0.333333 | 0.989011 | −0.98901 |
| 5 | 25.82 | 10.01 | 0.444559 | 1 | −1 |
| 6 | 32.27 | 9.72 | 0.555613 | 0.971029 | −0.97103 |
| 7 | 38.72 | 9.27 | 0.666667 | 0.926074 | −0.92607 |
| 8 | 45.18 | 8.77 | 0.777893 | 0.876124 | −0.87612 |
| 9 | 51.63 | 8.2 | 0.888946 | 0.819181 | −0.81918 |
| 10 | 58.08 | 0 | 1 | 0 | 0 |

TABLE 6D

FreeFoil 300

| | Actual [mm] | | Normalized [-] | | |
|---|---|---|---|---|---|
| N | x | y | x | y | Mirror y |
| 1 | 0 | 0 | 0 | 0 | 0 |
| 2 | 6.74 | 7.27 | 0.111129 | 0.735086 | −0.73509 |
| 3 | 13.47 | 9.09 | 0.222094 | 0.91911 | −0.91911 |

TABLE 6D-continued

FreeFoil 300

| | Actual [mm] | | Normalized [-] | | |
|---|---|---|---|---|---|
| N | x | y | x | y | Mirror y |
| 4 | 20.21 | 9.81 | 0.333223 | 0.991911 | -0.99191 |
| 5 | 26.95 | 9.89 | 0.444353 | 1 | -1 |
| 6 | 33.69 | 9.54 | 0.555482 | 0.964611 | -0.96461 |
| 7 | 40.43 | 9.06 | 0.666612 | 0.916077 | -0.91608 |
| 8 | 47.17 | 8.52 | 0.777741 | 0.861476 | -0.86148 |
| 9 | 53.91 | 7.89 | 0.888871 | 0.797776 | -0.79778 |
| 10* | 60.65 | 0 | 1 | 0 | 0 |

TABLE 6E

FreeFoil 343

| | Actual [mm] | | Normalized [-] | | |
|---|---|---|---|---|---|
| N | x | y | x | y | Mirror y |
| 1 | 0 | 0 | 0 | 0 | 0 |
| 2 | 7.69 | 6.81 | 0.111079 | 0.690669 | -0.69067 |
| 3 | 15.38 | 8.75 | 0.222158 | 0.887424 | -0.88742 |
| 4 | 23.08 | 9.68 | 0.333381 | 0.981744 | -0.98174 |
| 5 | 30.77 | 9.86 | 0.44446 | 1 | -1 |
| 6 | 38.46 | 9.43 | 0.55554 | 0.956389 | -0.95639 |
| 7 | 46.15 | 8.78 | 0.666619 | 0.890467 | -0.89047 |
| 8 | 53.85 | 8.14 | 0.777842 | 0.825558 | -0.82556 |
| 9 | 61.54 | 7.41 | 0.888921 | 0.751521 | -0.75152 |
| 10* | 69.23 | 0 | 1 | 0 | 0 |

TABLE 6F

FreeFoil 400

| | Actual [mm] | | Normalized [-] | | |
|---|---|---|---|---|---|
| N | x | y | x | y | Mirror y |
| 1 | 0 | 0 | 0 | 0 | 0 |
| 2 | 8.96 | 8.98 | 0.110987 | 0.898 | -0.898 |
| 3 | 17.93 | 10 | 0.222098 | 1 | -1 |
| 4 | 26.9 | 9.91 | 0.333209 | 0.991 | -0.991 |

TABLE 6F-continued

FreeFoil 400

| | Actual [mm] | | Normalized [-] | | |
|---|---|---|---|---|---|
| N | x | y | x | y | Mirror y |
| 5 | 35.87 | 9.46 | 0.444321 | 0.946 | -0.946 |
| 6 | 44.84 | 8.97 | 0.555432 | 0.897 | -0.897 |
| 7 | 53.82 | 8.37 | 0.666667 | 0.837 | -0.837 |
| 8 | 62.79 | 7.68 | 0.777778 | 0.768 | -0.768 |
| 9 | 71.76 | 7.02 | 0.888889 | 0.702 | -0.702 |
| 10* | 80.73 | 0 | 1 | 0 | 0 |

TABLE 6G

FreeFoil 500

| | Actual [mm] | | Normalized [-] | | |
|---|---|---|---|---|---|
| N | x | y | x | y | Mirror y |
| 1 | 0 | 0 | 0 | 0 | 0 |
| 2 | 11.37 | 7.73 | 0.111079 | 0.778449 | -0.77845 |
| 3 | 22.75 | 9.38 | 0.222255 | 0.944612 | -0.94461 |
| 4 | 34.12 | 9.93 | 0.333333 | 1 | -1 |
| 5 | 45.49 | 9.75 | 0.444412 | 0.981873 | -0.98187 |
| 6 | 56.87 | 9 | 0.555588 | 0.906344 | -0.90634 |
| 7 | 68.24 | 8.29 | 0.666667 | 0.834844 | -0.83484 |
| 8 | 79.61 | 7.67 | 0.777745 | 0.772407 | -0.77241 |
| 9 | 90.99 | 6.9 | 0.888921 | 0.694864 | 0.69486 |
| 10* | 102.36 | 0 | 1 | 0 | 0. |

18. The frame of claim 17, the profile substantially in accordance with Cartesian coordinate values of X and Y set forth in any one of the Tables 6A-6G respectively for data points N=2 through N=8.

19. The frame of claim 17, the profile substantially in accordance with Cartesian coordinate values of X and Y set forth in any one of the Tables 6A-6G for data points N=2 through N=9.

20. The frame of claim 17, the profile substantially in accordance with Cartesian coordinate values of X and Y set forth in any one of the Tables 6A-6G for data points N=1 through N=10.

\* \* \* \* \*

UNITED STATES PATENT AND TRADEMARK OFFICE
CERTIFICATE OF CORRECTION

PATENT NO. : 11,560,195 B2
APPLICATION NO. : 17/059168
DATED : January 24, 2023
INVENTOR(S) : Ingmar Jungnickel et al.

It is certified that error appears in the above-identified patent and that said Letters Patent is hereby corrected as shown below:

In the Specification

Column 7, Line 36, delete "FIG. 1A" and insert -- FIG. 1A. --.

Column 10, Line 32, delete "FIG." and insert -- FIGS. --.

In the Claims

Column 17, Line 19, Claim 7, after "from" delete "about".

Column 17, Line 20, Claim 7, after "to" delete "about".

Column 18, Line 37, Claim 17, delete "-0.8780S" and insert -- -0.87805 --.

Column 20, Line 33, Claim 18, before "for" delete "respectively".

Signed and Sealed this
Eleventh Day of July, 2023

Katherine Kelly Vidal
*Director of the United States Patent and Trademark Office*